US010986339B2

(12) United States Patent
Zhao et al.

(10) Patent No.: US 10,986,339 B2
(45) Date of Patent: Apr. 20, 2021

(54) METHOD AND APPARATUS FOR HARMONIZATION BETWEEN TRANSFORM SKIP MODE AND MULTIPLE TRANSFORM SELECTION

(71) Applicant: TENCENT AMERICA LLC, Palo Alto, CA (US)

(72) Inventors: Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 31 days.

(21) Appl. No.: 16/403,771

(22) Filed: May 6, 2019

(65) Prior Publication Data
US 2020/0260078 A1    Aug. 13, 2020

Related U.S. Application Data

(60) Provisional application No. 62/803,244, filed on Feb. 8, 2019.

(51) Int. Cl.
*H04N 19/12*    (2014.01)
*H04N 19/105*   (2014.01)
(Continued)

(52) U.S. Cl.
CPC .......... *H04N 19/12* (2014.11); *H04N 19/105* (2014.11); *H04N 19/176* (2014.11); *H04N 19/61* (2014.11); *H04N 19/625* (2014.11)

(58) Field of Classification Search
CPC .. H04N 19/176; H04N 19/122; H04N 19/124; H04N 19/129; H04N 19/136;
(Continued)

(56) References Cited

U.S. PATENT DOCUMENTS 10,728,552 B2 *  7/2020  Tsukuba ................. H04N 19/12
2016/0219290 A1 *  7/2016  Zhao ..................... H04N 19/109
(Continued)

FOREIGN PATENT DOCUMENTS

CN       104641646 A   *  5/2015   ........... H04N 19/187
TW       I650009 B         2/2019
WO    WO-2017171370 A1 * 10/2017   ........... H04N 19/119

OTHER PUBLICATIONS

Bross eta al., "Non-CE8: Unified Transform Type Signalling and Residual Coding for Transform Skip" Joint Video Experts Team (JVET) of ITU-T SG 16 WP 3 and ISO/IEC JTC 1/SC 29/WG 11 13th Meeting: Marrakech, MA, Jan. 9-18, 2019, Document: JVET-M0464-v4, 13 pages.*

(Continued)

*Primary Examiner* — Nathnael Aynalem
(74) *Attorney, Agent, or Firm* — Sughrue Mion, PLLC

(57) ABSTRACT

A method of controlling residual coding for decoding or encoding of a video sequence, is performed by at least one processor and includes, based on a multiple transform selection (MTS) index indicating that a transform skip mode is enabled for a coded block of the video sequence, identifying an identity transform as each of a horizontal transform and a vertical transform. The method further includes, based on the MTS index indicating that the transform skip mode is not enabled for the coded block, identifying one of a discrete cosine transform (DCT), a discrete sine transform (DST), a Hadamard transform and a Haar transform, as either one or both of the horizontal transform and the vertical transform. The method further includes performing the residual coding of the coded block, using the identified horizontal transform and the identified vertical transform.

20 Claims, 8 Drawing Sheets

(51) Int. Cl.
*H04N 19/176* (2014.01)
*H04N 19/61* (2014.01)
*H04N 19/625* (2014.01)

(58) Field of Classification Search
CPC ...... H04N 19/105; H04N 19/12; H04N 19/18; H04N 19/126; H04N 19/13; H04N 19/184; H04N 19/51; H04N 19/593; H04N 19/60; H04N 19/619; H04N 19/70; H04N 19/157; H04N 19/159; H04N 19/167; H04N 19/186; H04N 19/103; H04N 19/109; H04N 19/112; H04N 19/119; H04N 19/187; H04N 19/33; H04N 19/46; H04N 19/39; H04N 19/426; H04N 19/50; H04N 19/61; H04N 19/625; H04N 19/62; H04N 19/63; H04N 19/635; H04N 19/649; H04N 19/64; H04N 19/645; H04N 19/647
USPC .................................. 375/240.01–240.29
See application file for complete search history.

(56) References Cited

U.S. PATENT DOCUMENTS

| | | | | |
|---|---|---|---|---|
| 2017/0094314 | A1* | 3/2017 | Zhao | H04N 19/122 |
| 2017/0324643 | A1* | 11/2017 | Seregin | H04N 19/61 |
| 2019/0349587 | A1* | 11/2019 | Jang | H04N 19/136 |
| 2019/0387241 | A1* | 12/2019 | Kim | H04N 19/147 |
| 2020/0177882 | A1* | 6/2020 | Yoo | H04N 19/176 |

OTHER PUBLICATIONS

Bross et al., "Versatile Video Coding (Draft 3)" Joint Video Experts Team (JVET) of ITU-T SG 16 WP 3 and ISO/IEC JTC 1/SC 29/WG 11 12th Meeting: Macao, CN, Oct. 3-12, 2018, Document: Document: JVET-L1001-v9, 233 pages.*

De-Luxan-Hernandez et al., "Block Adaptive Selection of Multiple Core Transforms for Video Coding" 2016 IEEE, 6 pages.*

Zhao et al., "CE6 related: Unification of Transform Skip mode and MTS" Joint Video Experts Team (JVET) of ITU-T SG 16 WP 3 and ISO/IEC JTC 1/SC 29/WG 11 13th Meeting: Marrakech, MA, Jan. 9-18, 2019, Document: JVET-M0501-v2, 5 pages.*

International Search Report in International Application No. PCT/US20/16791, dated Apr. 24, 2020.

Written Opinion in International Application No. PCT/US20/16791, dated Apr. 24, 2020.

J. Boyce et al., "Algorithm Description of Joint Exploration Test Model 4", Joint Video Exploration Team, Jun. 2018, Chengdu, CN, pp. 1-36 (40 pages total).

* cited by examiner

FIG. 5    Encoder 303

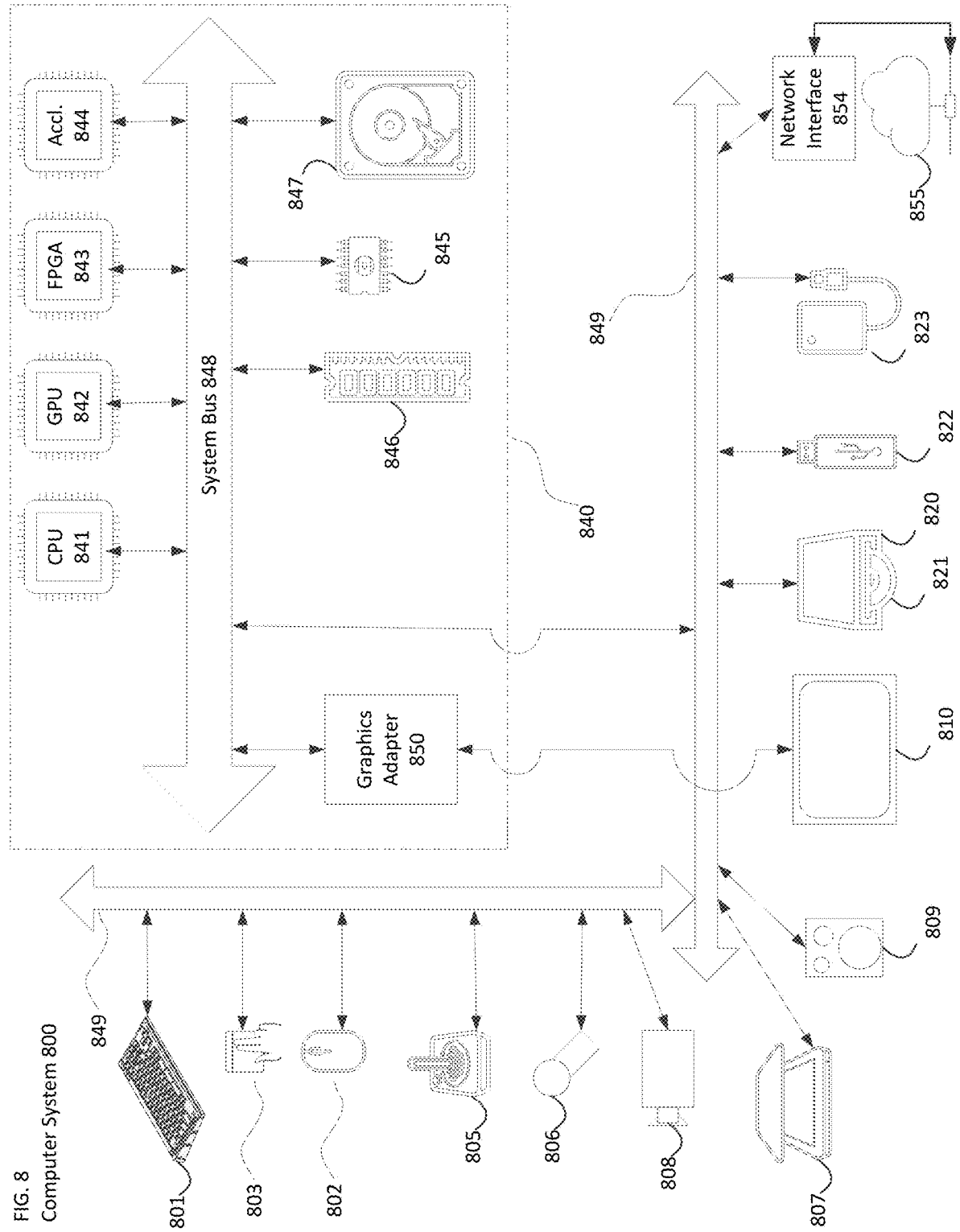

METHOD AND APPARATUS FOR HARMONIZATION BETWEEN TRANSFORM SKIP MODE AND MULTIPLE TRANSFORM SELECTION

CROSS-REFERENCE TO RELATED APPLICATION

This application claims priority from U.S. Provisional Patent Application No. 62/803,244, filed on Feb. 8, 2019, in the United States Patent and Trademark Office, which is incorporated herein by reference in its entirety.

BACKGROUND

1. Field

Methods and apparatuses consistent with embodiments relate to video coding, and more particularly, a method and an apparatus for harmonization between a transform skip mode and a multiple transform selection.

2. Description of Related Art

In High Efficiency Video Coding (HEVC), the primary transforms are 4-point, 8-point, 16-point and 32-point DCT-2 (Discrete Cosine Transform), and the transform core matrices are represented using 8-bit integers, i.e., 8-bit transform cores. The transform core matrices of smaller DCT-2 are part of a larger DCT-2, as shown below.

---

4 × 4 transform

{64, 64, 64, 64}
{83, 36, −36, −83}
{64, −64, −64, 64}
{36, −83, 83, −36}
8 × 8 transform {64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}
16 × 16 transform {64 64 64 64 64 64 64 64 64 64 64 64 64 64 64 64}
{90 87 80 70 57 43 25 9 9 25 43 57 70 80 87 90}
{89 75 50 18 18 50 75 89 89 75 50 18 18 50 75 89}
{87 57 9 43 80 90 70 25 25 70 90 80 43 −9 −57 −87}
{83 36 −36 −83 −83 −36 36 83 83 36 −36 −83 −83 −36 36 83}
{80 9 −70 −87 −25 57 90 43 −43 −90 −57 25 87 70 −9 −80}
{75 −18 −89 −50 50 89 18 −75 −75 18 89 50 −50 −89 −18 75}
{70 −43 −87 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 −87 43 70 −70 −43 87 9 −90 25 80 −57}
{50 −89 18 75 −75 −18 89 −50 −50 89 −18 −75 75 18 −89 50}
{43 −90 57 25 −87 70 9 −80 80 −9 −70 87 −25 −57 90 −43}
{36 −83 83 −36 −36 83 −83 36 36 −83 83 −36 −36 83 −83 36}
{25 −70 90 −80 43 9 −57 87 −87 57 −9 −43 80 −90 70 −25}
{18 −50 75 −89 89 −75 50 −18 −18 50 −75 89 −89 75 −50 18}
{9 −25 43 −57 70 −80 87 −90 90 −87 80 −70 57 −43 25 −9}
32 × 32 transform {64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 4 13 22 31 38 46 54 61 67 73 78 82 85 88 90 90}
{90 87 80 70 57 43 25 9 9 25 43 57 70 80 87 90 90 87 80 70 57 43 25 9 9 25 43 57 70 80 87 90}
{90 82 67 46 22 4 31 54 73 85 90 88 78 61 38 13 13 38 61 78 88 90 85 73 54 31 4 22 46 67 82 90}
{89 75 50 18 18 50 75 89 89 75 50 18 18 50 75 89 89 75 50 18 18 50 75 89 89 75 50 18 18 50 75 89}
{88 67 31 13 54 82 90 78 46 4 38 73 90 85 61 22 22 61 85 90 73 38 4 46 78 90 82 54 13 −31 −67 −88}
{87 57 9 43 80 90 70 25 25 70 90 80 43 9 57 87 87 57 9 43 80 90 70 25 25 70 90 80 43 9 57 87}
{85 46 13 67 90 73 22 38 82 88 54 −4 −61 −90 −78 −31 31 78 90 61 4 −54 −88 −82 −38 22 73 90 67 13 −46 −85}
{83 36 −36 −83 −83 −36 36 83 83 36 −36 −83 −83 −36 36 83 83 36 −36 −83 −83 −36 36 83 83 36 −36 −83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 −80 −9 70 87 25 −57 −90 −43 43 90 57 −25 −87 −70 9 80}
{78 −4 −82 −73 13 85 67 −22 −88 −61 31 90 54 −38 −90 −46 46 90 38 −54 −90 −31 61 88 22 −67 −85 −13 73 82 4 −78}
{75 −18 −89 −50 50 89 18 −75 −75 18 89 50 −50 −89 −18 75 75 −18 −89 −50 50 89 18 −75 −75 18 89 50 −50 −89 −18 75}
{73 −31 −90 −22 78 67 −38 −90 −13 82 61 −46 −88 −4 85 54 −54 −85 4 88 46 −61 −82 13 90 38 −67 −78 22 90 31 −73}
{70 −43 −87 9 90 25 −80 −57 57 80 −25 −90 −9 87 43 −70 −70 43 87 −9 −90 −25 80 57 −57 −80 25 90 9 −87 −43 70}
{67 −54 −78 38 85 −22 −90 4 90 13 −88 −31 82 46 −73 −61 61 73 −46 −82 31 88 −13 −90 −4 90 22 −85 −38 78 54 −67}
{64 −64 −64 64 64 −64 −64 64 64 −64 −64 64 64 −64 −64 64 64 −64 −64 64 64 −64 −64 64 64 −64 −64 64 64 −64 −64 64}
{61 −73 −46 82 31 −88 −13 90 −4 −90 22 85 −38 −78 54 67 −67 −54 78 38 −85 −22 90 4 −90 13 88 −31 −82 46 73 −61}
{57 −80 −25 90 −9 −87 43 70 −70 −43 87 9 −90 25 80 −57 −57 80 25 −90 9 87 −43 −70 70 43 −87 −9 90 −25 −80 57}
{54 −85 −4 88 −46 −61 82 13 −90 38 67 −78 −22 90 −31 −73 73 31 −90 22 78 −67 −38 90 −13 −82 61 46 −88 4 85 −54}
{50 −89 18 75 −75 −18 89 −50 −50 89 −18 −75 75 18 −89 50 50 −89 18 75 −75 −18 89 −50 −50 89 −18 −75 75 18 −89 50}
{46 −90 38 54 −90 31 61 −88 22 67 −85 13 73 −82 4 78 −78 −4 82 −73 −13 85 −67 −22 88 −61 −31 90 −54 −38 90 −46}
{43 −90 57 25 −87 70 9 −80 80 −9 −70 87 −25 −57 90 −43 −43 90 −57 −25 87 −70 −9 80 −80 9 70 −87 25 57 −90 43}
{38 −88 73 −4 −67 90 −46 −31 85 −78 13 61 −90 54 22 −82 82 −22 −54 90 −61 −13 78 −85 31 46 −90 67 4 −73 88 −38}
{36 −83 83 −36 −36 83 −83 36 36 −83 83 −36 −36 83 −83 36 36 −83 83 −36 −36 83 −83 36 36 −83 83 −36 −36 83 −83 36}
{31 −78 90 −61 4 54 −88 82 −38 −22 73 −90 67 −13 −46 85 −85 46 13 −67 90 −73 22 38 −82 88 −54 −4 61 −90 78 −31}
{25 −70 90 −80 43 9 −57 87 −87 57 −9 −43 80 −90 70 −25 −25 70 −90 80 −43 −9 57 −87 87 −57 9 43 −80 90 −70 25}
{22 −61 85 −90 73 −38 −4 46 −78 90 −82 54 −13 −31 67 −88 88 −67 31 13 −54 82 −90 78 −46 4 38 −73 90 −85 61 −22}
{18 −50 75 −89 89 −75 50 −18 −18 50 −75 89 −89 75 −50 18 18 −50 75 −89 89 −75 50 −18 −18 50 −75 89 −89 75 −50 18}
{13 −38 61 −78 88 −90 85 −73 54 −31 4 22 −46 67 −82 90 −90 82 −67 46 −22 −4 31 −54 73 −85 90 −88 78 −61 38 −13}
{9 −25 43 −57 70 −80 87 −90 90 −87 80 −70 57 −43 25 −9 −9 25 −43 57 −70 80 −87 90 −90 87 −80 70 −57 43 −25 9}
{4 −13 22 −31 38 −46 54 −61 67 −73 78 −82 85 −88 90 −90 90 −90 88 −85 82 −78 73 −67 61 −54 46 −38 31 −22 13 −4}

---

The DCT-2 cores show symmetry/anti-symmetry characteristics. Thus, a so-called "partial butterfly" implementation is supported to reduce the number of operation counts (multiplications, adds/subs, shifts), and identical results of matrix multiplication can be obtained using the partial butterfly implementation.

SUMMARY

According to embodiments, a method of controlling residual coding for decoding or encoding of a video sequence, is performed by at least one processor and includes, based on a multiple transform selection (MTS) index indicating that a transform skip mode is enabled for a coded block of the video sequence, identifying an identity transform as each of a horizontal transform and a vertical transform. The method further includes, based on the MTS index indicating that the transform skip mode is not enabled for the coded block, identifying one of a discrete cosine transform (DCT), a discrete sine transform (DST), a Hadamard transform and a Haar transform, as either one or both of the horizontal transform and the vertical transform. The method further includes performing the residual coding of the coded block, using the identified horizontal transform and the identified vertical transform.

According to embodiments, an apparatus for controlling residual coding for decoding or encoding of a video sequence includes at least one memory configured to store computer program code, and at least one processor configured to access the at least one memory and operate according to the computer program code. The computer program code includes first identifying code configured to cause the at least one processor to, based on a multiple transform selection (MTS) index indicating that a transform skip mode is enabled for a coded block of the video sequence, identify an identity transform as each of a horizontal transform and a vertical transform. The computer program code further includes second identifying code configured to cause the at least one processor to, based on the MTS index indicating that the transform skip mode is not enabled for the coded block, identify one of a discrete cosine transform (DCT), a discrete sine transform (DST), a Hadamard transform and a Haar transform, as either one or both of the horizontal transform and the vertical transform. The computer program code further includes performing code configured to cause the at least one processor to perform the residual coding of the coded block, using the identified horizontal transform and the identified vertical transform According to embodiments, a non-transitory computer-readable storage medium stores instructions that cause at least one processor to, based on a multiple transform selection (MTS) index indicating that a transform skip mode is enabled for a coded block of a video sequence, identify an identity transform as each of a horizontal transform and a vertical transform. The instructions further cause the at least one processor to, based on the MTS index indicating that the transform skip mode is not enabled for the coded block, identify one of a discrete cosine transform (DCT), a discrete sine transform (DST), a Hadamard transform and a Haar transform, as either one or both of the horizontal transform and the vertical transform. The instructions further cause the at least one processor to perform residual coding of the coded block, using the identified horizontal transform and the identified vertical transform.

BRIEF DESCRIPTION OF THE DRAWINGS

FIG. 8 is a diagram of a computer system suitable for implementing embodiments.

DETAILED DESCRIPTION

Figure 1A:
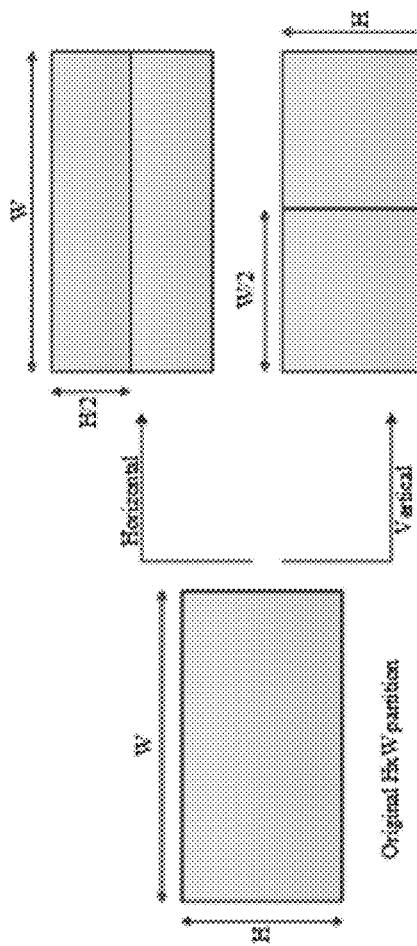
FIG. 1A is a diagram illustrating division of 4×8 and 8×4 blocks in an intra sub-partition (ISP) coding mode of Versatile Video Coding (VVC).

In current VVC, besides 4-point, 8-point, 16-point and 32-point DCT-2 transforms, which are same with HEVC, additional 2-point and 64-point DCT-2 are also included. The 64-point DCT-2 core defined in VVC is a 64×64 matrix.

In addition to DCT-2 and 4×4 DST-7 (Discrete Sine Transform), which have been employed in HEVC, an Adaptive Multiple Transform (AMT, or as known as Enhanced Multiple Transform (EMT), or as known as Multiple Transform Selection (MTS)) scheme has been used in VVC for residual coding for both inter and intra coded blocks. It uses multiple selected transforms from the DCT/DST families other than the current transforms in HEVC. The newly introduced transform matrices are DST-7, DCT-8. Table 1 shows the basis functions of the selected DST/DCT.

TABLE 1

Transform basis functions of DCT-2, DST-7 and DCT-8 for N-point input

| Transform Type | Basis function $T_i(j)$, i, j = 0, 1, ..., N − 1 |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

All the primary transform matrices in VVC are used with 8-bit representation. The AMT applies to the CUs with both width and height smaller than or equal to 32, and whether AMT applies or not is controlled by a flag called mts_flag. When the mts_flag is equal to 0, only DCT-2 is applied for coding the residue. When the mts_flag is equal to 1, an index mts_idx is further signaled using 2 bins to identify the horizontal and vertical transform to be used according Table 2, where value 1 means using DST-7 and value 2 means using DCT-8.

TABLE 2

Specification of trTypeHor and trTypeVer depending on mts_idx[ x ][ y ][ cIdx ]

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |

TABLE 2-continued

Specification of trTypeHor and trTypeVer depending on mts_idx[ x ][ y ][ cIdx ]

| mts_idx[ xTbY ][ yTbY ][ cIdx ] | trTypeHor | trTypeVer |
|---|---|---|
| 2 | 1 | 2 |
| 3 | 2 | 2 |

The transform core, which is a matrix composed by the basis vectors, of DST-7 can be also represented below:

4-point DST-7:

{a, b, c, d}
{c, c, 0, −c}
{d, −a, −c, b}
{b, −d, c, −a}
where {a, b, c, d} = {29, 55, 74, 84}
8-point DST-7:
{a, b, c, d, e, f, g, h,}
{c, f, h, e, b, −a, −d, −g,}
{e, g, b, −c, −h, −d, a, f,}
{g, c, −d, −f, a, h, b, −e,}
{h, −a, −g, b, f, −c, −e, d,}
{f, −e, −a, g, −d, −b, h, −c,}
{d, −h, e, −a, −c, g, −f, b,}
{b, −d, f, −h, g, −e, c, −a,}
where {a, b, c, d, e, f, g, h} = {17, 32, 46, 60, 71, 78, 85, 86}
16-point DST-7:

{a, b, c, d, e, f, g, h, i, j, k, l, m, n, o, p,}
{c, f, i, l, o, o, l, i, f, c, 0, −c, −f, −i, −l, −o,}
{e, j, o, m, h, c, −b, −g, −l, −p, −k, −f, −a, d, i, n,}
{g, n, l, e, −b, −i, −p, −j, −c, d, k, o, h, a, −f, −m,}
{i, o, f, −c, −l, −l, −c, f, o, i, 0, −i, −o, −f, c, l,}
{k, k, 0, −k, −k, 0, k, k, 0, −k, −k, 0, k, k, 0, −k,}
{m, g, −f, −n, −a, l, h, −e, −o, −b, k, i, −d, −p, −c, j,}
{o, c, −l, −f, i, i, −f, −l, c, o, 0, −o, −c, l, f, −i,}
{p, −a, −o, b, n, −c, −m, d, l, −e, −k, f, j, −g, −i, h,}
{n, −e, −i, j, d, −o, a, m, −f, −h, k, c, −p, b, l, −g,}
{l, −i, −c, o, −f, −f, o, −c, −i, l, 0, −l, i, c, −o, f,}
{j, −m, c, g, −p, f, d, −n, i, a, −k, l, −b, −h, o, −e,}
{h, −p, i, −a, −g, o, −j, b, f, −n, k, −c, −e, m, −l, d,}
{f, −l, o, −i, c, c, −i, o, −l, f, 0, −f, l, −o, i, −c,}
{d, −h, l, −p, m, −i, e, −a, −c, g, −k, o, −n, j, −f, b,}
{b, −d, f, −h, j, −l, n, −p, o, −m, k, −i, g, −e, c, −a,}
where {a, b, c, d, e, f, g, h, i, j, k, l, m, n, o, p} = {9, 17, 25, 33, 41, 49, 56, 62, 66, 72, 77, 81, 83, 87, 89, 90}
32-point DST-7:

{a, b, c, d, e, f, g, h, i, j, k, l, m, n, o, p, q, r, s, t, u, v, w, x, y, z, A, B, C, D, E, F,}
{c, f, i, l, o, r, u, x, A, D, F, C, z, w, t, q, n, k, h, e, b, −a, −d, −g, −j, −m, −p, −s, −v, −y, −B, −E,}
{e, j, o, t, y, D, D, y, t, o, j, e, 0, −e, −j, −o, −t, −y, −D, −D, −y, −t, −o, −j, −e, o, e, j, o, t, y, D,}
{g, n, u, B, D, w, p, i, b, −e, −l, −s, −z, −F, −y, −r, −k, −d, c, j, q, x, E, A, t, m, f, −a, −h, −o, −v, −C,}
{i, r, A, C, t, k, b, −g, −p, −y, −E, −v, −m, −d, e, n, w, F, x, o, f, −c, −l, −u, −D, −z, −q, −h, a, j, s, B,}
{k, v, F, u, j, −a, −l, −w, −E, −t, −i, b, m, x, D, s, h, −c, −n, −y, −C, −r, −g, d, o, z, B, q, f, −e, −p, −A,}
{m, z, z, m, 0, −m, −z, −z, −m, 0, m, z, z, m, 0, −m, −z, −z, −m, 0, m, z, z, m, 0, −m, −z, −z, −m, 0, m, z,}
{0, D, t, e, −j, −y, −y, −j, e, t, D, 0, 0, −o, −D, −t, −e, j, y, y, j, −e, −t, −D, −o, 0, 0, D, t, e, −j, −y,}
{q, E, n, −c, −t, −B, −k, f, w, y, h, −i, −z, −v, −e, l, C, s, b, −o, −F, −p, a, r, D, m, −d, −u, −A, −j, g, x,}
{s, A, h, −k, −D, −p, c, v, x, e, −n, −F, −m, f, y, u, b, −q, −C, −j, i, B, r, −a, −t, −z, −g, l, E, o, −d, −w,}
{u, w, b, −s, −y, −d, q, A, f, −o, −C, −h, n, E, j, −k, −F, −l, i, D, n, −g, −B, −p, e, z, r, −c, −x, −t, a, v,}
{w, s, −d, −A, −o, h, E, k, −l, −D, −g, p, z, c, a, x, r, −e, −B. −n, i, F, j, −m, −C, −f, −t, −v, q, y, b, −u,}
{y, o, −j, −D, −e, t, t, −e, −D, −j, o, y, 0, −y, −o, j, D, e, −t, −t, e, D, j, −o, −y, 0, y, o, −j, −D, −e, t,}
{A, k, −p, −v, e, F, f, −u, −q, j, B, a, −z, −l, o, w, −d, −E, −g, t, r, −i, −C, −b, y, m, −n, −x, c, D, h, −s,}
{C, g, −v, −n, o, u, −h, −B, a, D, f, −w, −m, p, t, −i, −A, b, E, e, −x, −l, q, s, −j, −z, c, F, d, −y, −k, r,}
{E, c, −B, −f, y, i, −v, −l, s, o, −p, −r, m, u, −j, −x, g, A, −d, −D, a, F, b, −C, −e, z, h, −w, −k, t, n, −q,}
{F, −a, −E, b, D, −c, −C, d, B, −e, −A, f, z, −g, −y, h, x, −i, −w, j, v, −k, −u, 1, t, −m, −s, n, r, −o, −q, p,}
{D, −e, −y, j, t, −o, −o, t, j, −y, −e, D, 0, −D, e, y, −j, −t, o, o, −t, −j, y, e, −D, 0, D, −e, −y, j, t, −o,}
{B, −i, −s, r, j, −A, −a, C, −h, −t, q, k, −z, −b, D, −g, −u, p, l, −y, −c, E, −f, −v, o, m, −x, −d, F, −e, −w, n,}
{z, −m, −m, z, 0, −z, m, m, −z, 0, z, −m, −m, z, 0, −z, m, m, −z, 0, z, −m, −m, z, 0, −z, m, m, −z, 0, z, −m,}
{x, −q, −g, E, −j, −n, A, −c, −u, t, d, −B, m, k, −D, f, r, −w, −a, y, −p, −h, −F, −i, −o, z, −b, −v, s, e, −C, l,}
{v, −u, −a, w, −t, −b, x, −s, −c, y, −r, −d, z, −q, −e, A, −p, −f, B, −o, −g, C, −n, −h, D, −m, −i, E, −l, −j, F, −k,}
{t, −y, e, o, −D, j, j, −D, o, e, −y, t, 0, −t, y, −e, −o, D, −j, −j, D, −o, −e, y, −t, 0, t, −y, e, o, −D, j,}
{r, −C, k, g, −y, v, −d, −n, F, −o, −c, u, −z, h, j, −B, s, −a, −q, D, −l, −f, x, −w, e, m, −E, p, b, −t, A, −i,+56
{p, −F, q, −a, −o, E, −r, b, n, −D, s, −c, −m, C, −t, d, l, −B, u, −e, −k, A, −v, f, j, −z, w, −g, −i, y, −x, h,}
{n, −B, w, −i, −e, s, −F, r, −d, −j, x, −A, m, a, −o, C, −v, h, f, −t, E, −q, c, k, −y, z, −l, −b, p, −D, u, −g,}
{l, −x, C, −q, e, g, −s, E, −v, j, b, −n, z, −A, o, −c, −i, u, −F, t, −h, −d, p, −B, y, −m, a, k, −w, D, −r, f,}
{j, −t, D, −y, o, −e, −e, o, −y, D, −t, j, 0, −j, t, −D, y, −o, e, e, −o, y, −D, t, −j, 0, j, −t, D, −y, o, −e,}
{h, −p, x, −F, y, −q, i, −a, −g, 0, −w, E, −z, r, −j, b, f, −n, v, −D, A, −s, k, −c, −e, m, −u, C, −B, t, −l, d,}
{f, −l, r, −x, D, −C, w, −q, k, −e, −a, g, −m, s, −y, E, −B, v, −p, j, −d, −b, h, −n, t, −z, F, −A, u, −o, i, −c,}
{d, −h, l, −p, t, −x, B, −F, C, −y, u, −q, m, −i, e, −a, −c, g, −k, o, −s, w, −A, E, −D, z, −v, r, −n, j, −f, b,}
{b, −d, f, −h, j, −l, n, −p, r, −t, v, −x, z, −B, D, −F, E, −C, A, −y, w, −u, s, −q, o, −m, k, −i, g, −e, c, −a,}
where {a, b, c, d, e, f, g, h, i, j, k, l, m, n, o, p, q, r, s, t, u, v, w, x, y, z, A, B, C, D, E, F } = { 4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90 }
4-point DCT-8:

{a, b, c, d,}
{b, 0, −b, −b,}
{c, −b, −d, a,}
{d, −b, a, −c,}
where {a, b, c, d} = {84, 74, 55, 29}
8-point DCT-8:

{a, b, c, d, e, f, g, h,}
{b, e, h, −g, −d, −a, −c, −f,}
{c, h, −e, −a, −f, g, b, d,}
{d, −g, −a, −h, c, e, −f, −b,}

-continued

{e, −d, −f, c, g, −b, −h, a,}
{f, −a, g, e, −b, h, d, −c,}
{g, −c, b, −f, −h, d, −a, e,}
{h, −f, d, −b, a, −c, e, −g,}
where {a, b, c, d, e, f, g, h}= {86, 85, 78, 71, 60, 46, 32, 17}
16-point DCT-8:

{a, b, c, d, e, f, g, h, i, j, k, l, m, n, o, p,}
{b, e, h, k, n, 0, −n, −k, −h, −e, −b, −b, −e, −h,
−k, −n,}
{c, h, m, −p, −k, −f, −a, −e, −j, −o, n,
i, d, b, g, l,}
{d, k, −p, −i, −b, −f, −m, n, g, a, h, o, −l, −e, −c,
−j,}
{e, n, −k, −b, −h, 0, h, b, k, −n, −e, −e,
−n, k, b, h,}
{f, 0, −f, −f, 0, f, f, 0, −f, −f, 0, f, f, 0, −f, −f,}
{g, −n, −a, −m, h, f, −o, −b, −l, i, e, −p, −c,
−k, j, d,}
{h, −k, −e, n, b, 0, −b, −n, e, k, −h, −h, k, e,
−n, −b,}
{i, −h, −j, g, k, −f, −l, e, m, −d, −n, c, o, −b,
−p, a,}
{j, −e, −o, a, −n, −f, i, k, −d, −p, b, −m, −g,
h, l, −c,}
{k, −b, n, h, −e, 0, e, −h, −n, b, −k, −k, b,
−n, −h, e,}
{l, −b, i, o, −e, f, −p, −h, c, −m, −k, a, −j,
−n, d, −g,}
{m, −e, d, −l, −n, f, −c, k, o, −g, b, −j, −p,
h, −a, i,}
{n, −h, b, −e, k, 0, −k, e, −b, h, −n, −n, h,
−b, e, −k,}
{o, −k, g, −c, b, −f, j, −n, −p, l, −h, d,
−a, e, −i, m,}
{p, −n, l, −j, h, −f, d, −b, a, −c, e, −g, i,
−k, m, −o,}
where {a, b, c, d, e, f, g, h, i, j, k, l, m, n, o, p} = {90, 89, 87, 83, 81, 77, 72, 66, 62, 56, 49, 41, 33, 25, 17, 9}
32-point DCT-8:

{a, b, c, d, e, f, g, h, i, j, k, l, m, n, o, p, q, r, s, t, u, v, w
x, y, z, A, B, C, D, E, F,}
{b, e, h, k, n, q, t, w, z, C, F, −E, −B, −y, −v, −s, −p,
−m, −j, −g, −d, −a, −d, −f, −i, −l, −o, −r,
−u, −x, −A, −D,}
{c, h, m, r, w, B, 0, −B, −w, −r, −m, −h, −c, −c,
−h, −m, −r, −w, −B, o, B, w, r, m, h, c, c, h, m, r, w, B,}
{d, k, r, y, F, −A, −t, −m, −f, −b, −i, −p, −w,
−D, C, v, o, h, a, g, n, u, B, −E, −x, −q, −j, −c, −e,
−l, −s, −z,}
{e, n, w, F, −y, −p, −g, −c, −l, −u, −D, A, r, i, a, j,
s, B, −C, −t, −k, −b, −h, −q, −z, E, v, m, d, f, o, x,}
{f, q, B, −A, −p, −e, −g, −r, −C, z, o, d, h, s, D, −y,
−n, −c, −i, −t, −E, x, m, b, j, u, F, −w, −l, −a,
−k, −v,}
{g, t, 0, −t, −g, −g, −t, 0, t, g, g, t, 0, −t, −g, −g,
−t, 0, t, g, g, t, 0, −t, −g, −g, −t, 0, t, g, g, t,}
{h, w, −B, −m, −c, −r, 0, r, c, m, B, −w, −h, −h,
−w, B, m, c, r, 0, −r, −c, −m, −B, w, h, h, w, −B, −m,
−c, −r,}
{i, z, −w, −f, −l, −C, t, c, o, F, −q, −a, −r, E, n, d, u,
−B, −k, −g, −x, y, h, j, A, −v, −e, −m, −D, s, b, p,}
{j, C, −r, −b, −u, z, g, m, F, −o, −e, −x, w,
d, p, −E, −l, −h, −A, t, a, s, −B, −i, −k, −D, q,
c, v, −y, −f, −n,}
{k, F, −m, −i, −D, o, g, B, −q, −e, −z, s, c, x, −u,
−a, −v, w, b, t, −y, −d, −r, A, f, p, −C, −h, −n,
E, j, l,}
{l, −E, −h, −p, A, d, t, −w, −a, −x, s, e, B, −o, −i,
−F, k, m, −D, −g, −q, z, c, u, −v, −b, −y, r, f, C, −n,
−j,}
{m, −B, −c, −w, r, h, 0, −h, −r, w, c, B, −m, −m, B,
c, w, −r, −h, 0, h, r, −w, −c, −B, m, m, −B, −c,
−w, r, h,}
{n, −y, −c, −D, i, s, −t, −h, E, d, x, −o, −m, z, b, C,
−j, −r, u, q, −F, −e, −w, p, l, −A, −a, −B, k, q,
−v, −f,}

{o, −v, −h, C, a, D, −g, −w, n, p, −u, −l, B, b, E, −f,
−x, m, q, −t, −j, A, c, F, −e, −y, l, r, −s, −k, z, d,}
{p, −s, −m, v, j, −y, −g, B, d, −E, −a, −F, c, C, −f,
−z, i, w, −l , −t, o, q, −r, −n, u, k, −x, −h, A, e,
−D, −b,}
{q, −p, −r, o, s, −n, −t, m, u, −l, −v, k, w, −j, −x, i,
y, −h, −z, q, A, −f, −B, e, C, −d, −D, c, E,
−b, −F, a,}
{r, −m, −w, h, B, −c, 0, c, −B, −h, w, m, −r, −r, m,
−r, −r, m, w, −h, −B, c, 0, −c, B, h, −w, −m, r, r,
−m, −w, h, B, −c,}
{s, −j, −B, a, −C, −i, t, r, −i, t, r, −k, −A, b, −D,
−h, u, q, −l, −z, c, −E, −g, v, p, −m, −y, d, −F,
−f, w, o, −n, −, e,}
{t, −g, 0, g, −t, −t, g, 0, −g, t, t, −g, 0, g, −t, −t,
g, 0, −g, t, t, −g, 0, g, −t, −t, g, 0, −g, t, t, −g,}
{u, −d, B, n, −k, −E, g, −r, −x, a, −y, −q, h, −F,
−j, o, A, −c, v, t, −e, C, m, −l, −D, f, −s, −w, b, −z,
−p, i,}
{v, −a, w, u, −b, x, t, −c, y, s, −d, z, r, −e, A, q, −f, B,
p, −g, C, 0, −h, D, n, −i, E, m, −j, F, l, −k,}
{w, −c, r, B, −h, m, 0, −m, h, −B, −r, c, −w, −w, c,
−r, B, h, −m, 0, m, −h, B, r, −c, w, w, −c, r, B, −h, m,}
{x, −f, m, −E, −q, b, −t, −B, j, −i, A, u, −c, p, F,
−n, e, −w, −y, g, −l, D, r, −a, s, C, −k, h, −z, −v,
d, −o,}
{y, −i, h, −x, −z, j, −g, w, A, −k, f, −v, −B, l, −e,
u, C, −m, d, −t, −D, n, −c, s, E, −o, b, −r, −F, p,
−a, q,}
{z, −l, c, −q, E, u, −g, h, −v, −D, p, −b, m, −A, −y,
k, −d, r, −F, −t, f, −i, w, C, −o, a, −n, B, x,
−j, e, −s,}
{A, −o, c, −j, v, F, −t, h, −e, q, −C, −y, m, −a, l,
−x, −D, r, −f, g, −s, E, w, −k, b, −n, z, B, −p, d,
−i, u,}
{B, −r, h, −c, m, −w, 0, w, −m, c, −h, r, −B, −B, r,
−h, c, −m, w, 0, −w, m, −c, h, −r, B, B, −r, h, −c, m,
−w,}
{C, −u, m, −e, d, −l, t, −B, −D, v, −n, f, −c, k,
−s, A, E, −w, o, −g, b, −j, r, −z, −F, x, −p, h, −a, i,
−q, y,}
{D, −x, r, −l, f, −a, g, −m, s, −y, E, C, −w, q, −k, e,
−b, h, −n, t, −z, F, B, −v, p, −j, d, −c, i, −o, u,
−A, }
{E, −A, w, −s, o, −k, g, −c, b, −f, j, −n, r, −v, z,
−D, −F, B, −x, t, −p, l, −h, d, −a, e, −i, m, −q, u,
−y, C,}
{F, −D, B, −z, x, −v, t, −r, p, −n, l, −j, h, −f, d,
−b, a, −c, e, −g, i, −k, m, −o, q, −s, u, −w, y, −A,
C, −E,}
where {a, b, c, d, e, f, g, h, i, j, k, l, m, n, o, p, q, r, s, t, u, v,
w, x, y, z, A, B, C, D, E, F } = {90, 90, 89, 88, 88, 86, 85, 84,
82, 80, 78, 77, 74, 72, 68, 66, 63, 60, 56, 53, 50,
45, 42, 38, 34, 30, 26, 21, 17, 13, 9, 4}

In VVC, when both the height and width of the coding block is smaller than or equal to 64, the transform size is always the same as the coding block size. When either the height or width of the coding block is larger than 64, when doing the transform or intra prediction, the coding block is further split into multiple sub-blocks, in which the width and height of each sub-block is smaller than or equal to 64, and one transform is performed on each sub-block.

Figure 2:
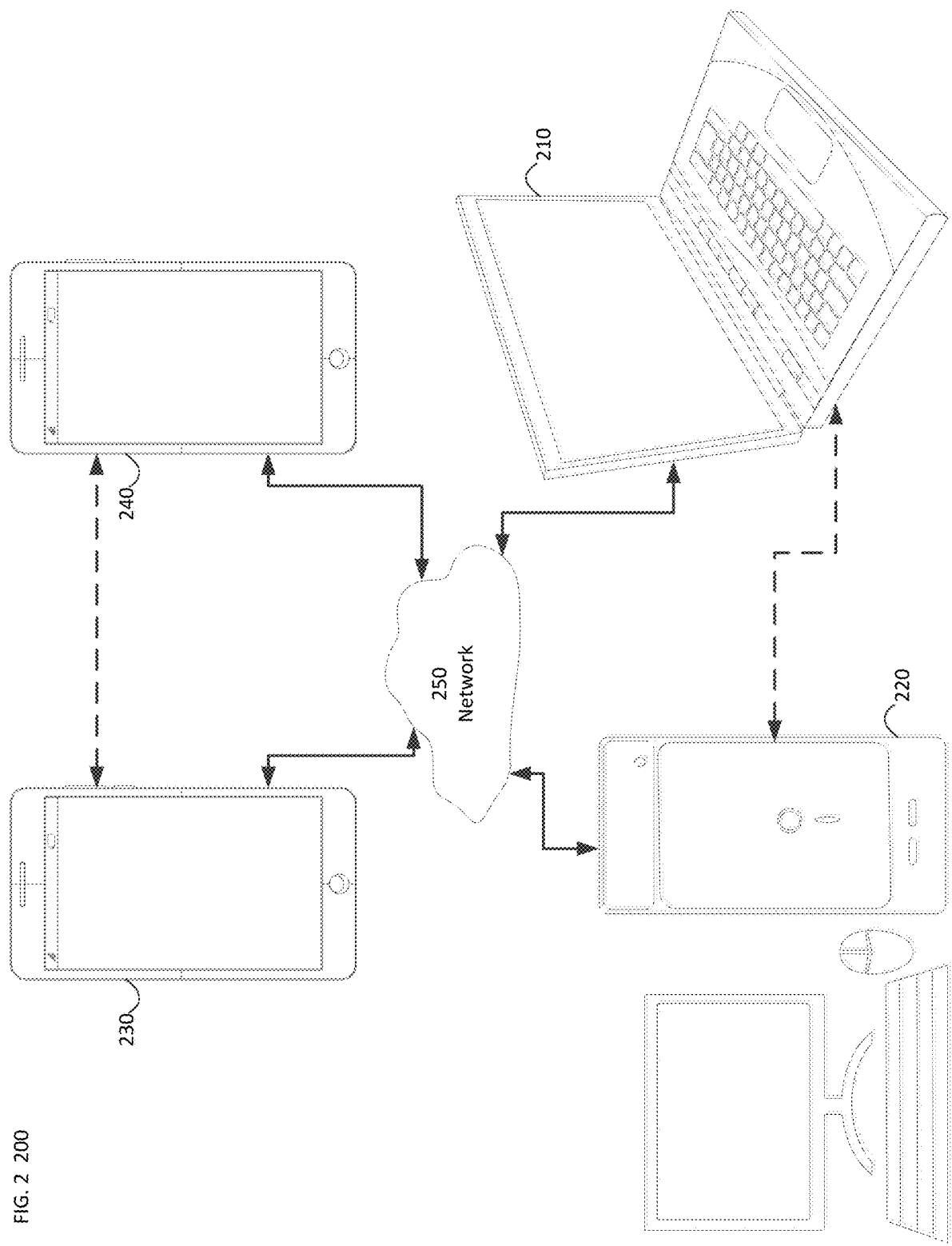
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

The related syntax and semantics of MTS in VVC draft version 2 is described below (as highlighted in italics):

| 7.3.4.11 Transform unit syntax | |
|---|---|
| | Descriptor |

```
transform_unit( x0, y0, tbWidth, tbHeight, treeType) {
  if( treeType = = SINGLE_TREE | | treeType = = DUAL_TREE_LUMA )
    tu_cbf_luma[ x0 ][ y0 ]                                              ae(v)
  if( treeType = = SINGLE_TREE | | treeType = = DUAL_TREE_CHROMA ) {
    tu_cbf_cb[ x0 ][ y0]                                                 ae(v)
    tu_cbf_cr[ x0 ][ y0 ]                                                ae(v)
  }
  if(
  ( ( ( CuPredMode[ x0 ][ y0 ] = = MODE_INTRA ) && sps_mts_intra_enabled_flag ) | |
    ( ( CuPredMode[ x0 ][ y0 ] = = MODE_INTER ) && sps_mts_inter_enabled_flag ) )
    && tu_cbf_luma[ x0 ][ y0 ] && tree Type ! = DUAL_TREE_CHROMA
    && ( tbWidth <= 32) && ( tbHeight <= 32 ) )
    cu_mts_flag[ x0 ][ y0 ]                                              ae(v)
  if( tu_cbf_luma[ x0 ][ y0 ] )
    residual_coding( x0, y0, log2( tbWidth ), log2( tbHeight ), 0 )
  if( tu_cbf_cb[ x0][ y0 ] )
    residual_coding( x0, y0, log2( tbWidth / 2 ), log2( tbHeight / 2), 1 )
  if( tu_cbf_cr[ x0 ][ y0 ] )
    residual_coding( x0, y0, log2( tbWidth / 2 ), log2( tbHeight / 2 ), 2 )
}
```

| 7.3.4.12 Residual coding syntax | |
|---|---|
| | Descriptor |

```
residual_coding( x0, y0, log2TbWidth, log2TbHeight, cIdx ) {
  if( transform_skip_enabled_flag && ( cIdx ! = 0 | | cu_mts_flag[ x0 ][ y0 ] = = 0 ) &&
    ( log2TbWidth <= 2 ) && ( log2TbHeight <= 2 ) )
    transform_skip_flag[ x0 ][ y0 ][ cIdx ]                              ae(v)
  last_sig_coeff_x_prefix                                                ae(v)
  last_sig_coeff_y_prefix                                                ae(v)
  if( last_sig_coeff_x_prefix > 3 )
    last_sig_coeff_x_suffix                                              ae(v)
  if( last_sig_coeff_y_prefix > 3)
    last_sig_coeff_y_suffix                                              ae(v)
      ......
  if( dep_quant_enabled_flag ) {
    QState = startQStateSb
    for( n = numSbCoeff − 1; n >= 0; n− − ) {
      xC = ( xS << log2SbSize ) +
        DiagScanOrded[ log2SbSize ][ log2SbSize ][ n ][ 0 ]
      yC = ( yS << log2SbSize ) +
        DiagScanOrded[ log2SbSize ][ log2SbSize ][ n ][ 1 ]
      if( sig_coeff_flag[ xC ][ yC ] )
        TransCoeffLevel[ x0 ][ y0 ][ cIdx ][ xC ][ yC ] =
          ( 2 * AbsLevel[ xC ][ yC ] − ( QState > 1 ? 1 : 0 ) ) *
          ( 1 − 2 * coeff_sign_flag[ n ] )
      QState = QStateTransTable[ QState ][ par_level_flag[ n ] ]
    } else {
      sumAbsLevel = 0
      for( n = numSbCoeff − 1; n >= 0; n− − ) {
        xC = ( xS << log2SbSize ) +
          DiagScanOrder[ log2SbSize ][ log2SbSize ][ n ][ 0 ]
        yC = ( yS << log2SbSize ) +
          DiagScanOrder[ log2SbSize ][ log2SbSize ][ n ][ 1 ]
        if( sig_coeff_flag[ xC ][ yC ]) {
          TransCoeffLevel[ x0 ][ y0 ][ cIdx ][ xC ][ yC ]=
            AbsLevel[ xC ][ yC ] * ( 1 − 2 * coeff_sign_flag[ n ])
          if( signHidden ) {
            sumAbsLevel += AbsLevel[ xC ][ yC ]
            if( ( n = = firstSigScanPosSb ) && ( sumAbsLevel % 2) = = 1 ) )
              TransCoeffLevel[ x0 ][ y0 ][ cIdx ][ xC ][ yC ] =
                −TransCoeffLevel[ x0 ][ y0 ][ cIdx ][ xC ][ yC ]
          }
        }
      }
    }
  }
}
```

-continued 7.3.4.12 Residual coding syntax

| | Descriptor |
|---|---|
| if( cu_mts_flag[ x0 ][ y0 ] && ( cIdx = = 0 ) &&<br>  !transform_skip_flag[ x0 ][ y0 ][ cIdx ] &&<br>  ( ( CuPredMode[ x0 ][ y0 ] = = MODE_INTRA && numSigCoeff > 2 ) \|\|<br>    ( CuPredMode[ x0 ][ y0 ] = = MODE_INTER ) ) ) {<br>  mts_idx[ x0 ][ y0 ]<br>} | ae(v) |

7.4.5.11 Transform Unit Semantics cu_mts_flag[x0][y0] equal to 1 specifies that multiple transform selection is applied to the residual samples of the associated luma transform block. cu_mts_flag[x0][y0 ] equal to 0 specifies that multiple transform selection is not applied to the residual samples of the associated luma transform block. The array indices x0, y0 specify the location (x0, y0) of the top-left luma sample of the considered transform block relative to the top-left luma sample of the picture.

When cu_mts_flag[x0][y0] is not present, it is inferred to be equal to 0.

7.4.5.12 Residual Coding Semantics transform_skip_flag[x0] [y0][cIdx]specifies whether a transform is applied to the associated transform block or not: The array indices x0, y0 specify the location (x0, y0) of the top-left luma sample of the considered transform block relative to the top-left luma sample of the picture. The array index cIdx specifies an indicator for the colour component; it is equal to 0 for luma, equal to 1 for Cb and equal to 2 for Cr. transform_skip_flag[x0][y0][cIdx]equal to 1 specifies that no transform is applied to the current transform block. transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

last_sig_coeff_x_prefix specifies the prefix of the column position of the last significant coefficient in scanning order within a transform block. The values of last_sig_coeff_x_prefix shall be in the range of 0 to (log 2TbWidth<<1)-1, inclusive.

last_sig_coeff_y_prefix specifies the prefix of the row position of the last significant coefficient in scanning order within a transform block. The values of last_sig_coeff_y_prefix shall be in the range of 0 to (log 2TbHeight<<1)-1, inclusive.

last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1)-1))-1, inclusive.

The column position of the last significant coefficient in scanning order within a transform block LastSignificantCoeffX is derived as follows:

If last_sig_coeff_x_suffix is not present, the following applies:
LastSignificantCoeffX=last_sig_coeff_x_prefix Otherwise (last_sig_coeff_x_suffix is present), the following applies:
LastSignificantCoeffX=(1<<((last_sig_coeff_x_prefix>>1)-1))*(2+(last_sig_coeff_x_prefix & 1))+last_sig_coeff_x_suffix coeff_sign_flag[n] specifies the sign of a transform coefficient level for the scanning position n as follows:
If coeff_sign_flag[n] is equal to 0, the corresponding transform coefficient level has a positive value.
Otherwise (coeff_sign_flag[n] is equal to 1), the corresponding transform coefficient level has a negative value.

When coeff_sign_flag[n] is not present, it is inferred to be equal to 0.

mts_idx[x0][y0] specifies which transform kernels are applied to the luma residual samples along the horizontal and vertical direction of the current transform block. The array indices x0, y0 specify the location (x0, y0) of the top-left luma sample of the considered transform block relative to the top-left luma sample of the picture.

When mts_idx[x0][y0] is not present, it is inferred to be equal to −1.

In VVC, a Transform Skip Mode (TSM) is applied for coding both intra and inter prediction residuals. For a coding block (both luma and chroma) with less than or equal to 16 samples, a flag is signaled to indicate whether TSM is applied for current block. When TSM is applied, the detailed modifications for each module are list below.

(a) Prediction: No change.
(b) Transform: Skipped. Instead, for transform skipping TUs, a simple scaling process is used. To let transform skipping coefficients have similar magnitudes as other transform coefficients, a scaling-down process is performed, and the scaling factor is same with the scaling associated with other transforms (versus standard floating point transform with norm 1) of the same size.
(c) Entropy coding: A flag is signaled to indicate if transform is bypassed or not.
(d) Deblocking, SAO and ALF: No change.
(e) A flag in the Sequence Parameter Set (SPS) to indicate whether transform skipping is enabled or not.

The related spec text of TSM in VVC draft version 2 is described below (as highlighted in italics):

7.3.4.13 Residual coding syntax

| | Descriptor |
|---|---|
| residual_coding( x0, y0, log2TbWidth, log2TbHeight, cIdx ) {<br>  if( transform_skip_enabled_flag && ( cIdx != 0 \|\| cu_mts_flag[ x0 ][ y0 ] = = 0 ) &&<br>    ( log2TbWidth <= 2 ) && ( log2TbHeight <= 2 ) )<br>    transform_skip_flag [ x0 ][ y0 ][ cIdx ] | ae(v) |

-continued

| 7.3.4.13 Residual coding syntax | |
|---|---|
| | Descriptor |
| last_sig_coeff_x_prefix | ae(v) |
| last_sig_coeff_y_prefix | ae(v) |
| if( last_sig_coeff_x_prefix > 3 ) | |
|    last_sig_coeff_x_suffix | ae(v) |
| if( last_sig_coeff_y_prefix > 3 ) | |
|    last_sig_coeff_y_suffix | ae(v) |
| log2SbSize = ( Min( log2TbWidth, log2TbHeight ) < 2 ? 1 : 2 ) | |
| numSbCoeff = 1 << ( log2SbSize << 1 ) | |
| lastScanPos = numSbCoeff | |
| ...... | |

7.4.5.12 Residual Coding Semantics transform_skip_flag[x0][y0][cdx] specifies whether a transform is applied to the associated transform block or not: The array indices x0, y0 specify the location (x0, y0) of the top-left luma sample of the considered transform block relative to the top-left luma sample of the picture. The array index cdx specifies an indicator for the colour component; it is equal to 0 for luma, equal to 1 for Cb and equal to 2 for Cr. transform_skip_flag[x0][y0][cIdx] equal to 1 specifies that no transform is applied to the current transform block. transform_skip_flag[x0][y0][cIdx] equal to 0 specifies that the decision whether transform is applied to the current transform block or not depends on other syntax elements. When transform_skip_flag[x0][y0][cdx] is not present, it is inferred to be equal to 0.

last_sig_coeff_x_prefix specifies the prefix of the column position of the last significant coefficient in scanning order within a transform block. The values of last_sig_coeff_x_prefix shall be in the range of 0 to (log 2TbWidth<<1)-1, inclusive.

8.5.2 Scaling and Transformation Process

Inputs to this process are:
- a luma location (xTbY, yTbY) specifying the top-left sample of the current luma transform block relative to the top-left luma sample of the current picture,
- a variable cIdx specifying the colour component of the current block,
- a variable nTbW specifying the transform block width,
- a variable nTbH specifying the transform block height.

Output of this process is the (nTbW)x(nTbH) array of residual samples resSamples[x][y] with x=0 . . . nTbW-1, y=0 . . . nTbH-1.

The variables bitDepth, bdShift and tsShift are derived as follows:
bitDepth=(cIdx==0)?BitDepth$_Y$:BitDepth$_C$
bdShift=Max(22-bitDepth, 0)
tsShift=5+((Log 2(nTbW)+Log 2(nTbH))/2)

The (nTbW)x(nTbH) array of residual samples resSamples is derived as follows:

1. The scaling process for transform coefficients as specified in clause 8.5.3 is invoked with the transform block location (xTbY, yTbY), the transform width nTbW and the transform height nTbH, the colour component variable cIdx and the bit depth of the current colour component bitDepth as inputs, and the output is an (nTbW)x(nTbH) array of scaled transform coefficients d.
2. The (nTbW)x(nTbH) array of residual samples r is derived as follows:
   If transform_skip_flag[xTbY][yTbY][cIdx] is equal to 1, the residual sample array values r[x][y] with x=0 . . . nTbW-1, y=0 . . . nTbH-1 are derived as follows:
   r[x][y]=d[x][y]<<tsShift Otherwise (transform_skip_flag[xTbY][yTbY][cIdx] is equal to 0), the transformation process for scaled transform coefficients is invoked with the transform block location (xTbY, yTbY), the transform width nTbW and the transform height nTbH, the colour component variable cIdx and the (nTbW)x(nTbH) array of scaled transform coefficients d as inputs, and the output is an (nTbW)x(nTbH) array of residual samples r.

3. The residual samples resSamples[x][y] with x=0 . . . nTbW-1, y=0 . . . nTbH-1 are derived as follows: resSamples[x][y]=(r[x][y]+(1<<(bdShift-1)))>> bdShift 8.5.3 Scaling Process for Transform Coefficients Inputs to this process are:
- a luma location (xTbY, yTbY) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[x][y]. The quantization parameter qP is derived as follows:
If cIdx is equal to 0, the following applies:
qP=Qp'$_Y$
Otherwise, if cIdx is equal to 1, the following applies:
qP=Qp'$_{Cb}$
Otherwise (cIdx is equal to 2), the following applies:
qP=Qp'$_{Cr}$ The variables bdShift, rectNorm and bdOffset are derived as follows:
bdShift=bitDepth+(((Log 2(nTbW)+Log 2(nTbH)) & 1)*8+(Log 2(nTbW)+Log 2(nTbH))/2)-5+dep_quant_enabled_flag
rectNorm=((Log 2(nTbW)+Log 2(nTbH)) & 1)==1?181:1
bdOffset=(1<<bdShift)>>1

The list levelScale[ ] is specified as levelScale[k]={40, 45, 51, 57, 64, 72} with k=0 . . . 5.

For the derivation of the scaled transform coefficients d[x][y] with x=0 . . . nTbW-1, y=0 . . . nTbH-1, the following applies:
The intermediate scaling factor m[x][y] is set equal to 16.
The scaling factor s[x][y] is derived as follows:
If dep_quant_enabled_flag is equal to 1, the following applies:
ls[x][y]=(m[x][y] *levelScale[(qP+1) % 6])<<((qP+1)/6)

Otherwise (dep_quant_enabled_flag is equal to 0), the following applies:

ls[x][y]=(m[x][y] *levelScale[qP %6])<<(qP/6)

The value dnc[x][y] is derived as follows:

dnc[x][y]=(TransCoeffLevel[xTbY][yTbY][cIdx][x][y] *s[x][y] *rectNorm+bdOffset)>> bdShift The scaled transform coefficient d[x][y] is derived as follows:

d[x][y]=Clip3(CoeffMin, CoeffMax, dnc[x][y])

In Joint Video Exploration Team (JVET)-M0464, a modified syntax design for transform skip and MTS has been proposed and adopted into VVC Draft 3. The following table illustrates the modified syntax of the proposed joint syntax element tu_mts_idx compared to VVC Draft 3.

| VVC Draft 3 | Proposed |
|---|---|
| transform_unit( ) | transform_unit( ) |
|   tu_cbf_luma |   tu_cbf_luma |
| ... | |
|   if( ... tu_cbf_luma &&<br>    ( tbWidth <= 32 ) &&<br>    ( tbHeight <= 32 ) ... )<br>    tu_mts_flag<br>residual_coding( cIdx )<br>  if( ( cIdx ! = 0 \|\| !tu_mts_flag) &&<br>    ( log2TbWidth <= 2) &&<br>    ( log2TbHeight <= 2 ) )<br>    transform_skip_flag[ cIdx ]<br>... /* coefficient parsing */ ...<br>  if( tu_mts_flag && cIdx = = 0 )<br>    mts_idx |   if( ... tu_cbf_luma &&<br>    ( tbWidth <= 32 ) &&<br>    ( tbHeight <= 32 ) ... )<br>    tu_mts_idx |

Instead of parsing the MTS flag first, then the TS flag followed by fixed length coding with 2 bins for the MTS index, the new joint syntax element tu_mts_idx uses truncated unary binarization. The first bin indicates TS, the second MTS and all following the MTS index. The complete semantics and binarization is shown in the following table:

| | transform type | | binarization | | |
|---|---|---|---|---|---|
| tu_mts_idx | horizontal | vertical | enabled | MTS enabled | TS enabled |
| 0 | SKIP | SKIP | 0 | — | 0 |
| 1 | DCT-2 | DCT-2 | 10 | 0 | 1 |
| 2 | DST-7 | DST-7 | 110 | 10 | — |
| 3 | DCT-8 | DST-7 | 1110 | 110 | — |
| 4 | DST-7 | DCT-8 | 11110 | 1110 | — |
| 5 | DCT-8 | DCT-8 | 11111 | 1111 | — |

The number of context models is not changed and the assignment of the context index increment ctxInc to each bin of tu_mts_idx is as follows:

| | binIdx | | | | | |
|---|---|---|---|---|---|---|
| Syntax element | 0 | 1 | 2 | 3 | 4 | >=5 |
| tu_mts_idx (MTS & TS) | 0 | 1 ... 6 (1 + cqtDepth) | 7 | 8 | 9 | na |
| tu_mts_idx (MTS) | 1 ... 6 (1 + cqtDepth) | 7 | 8 | 9 | na | na |
| tu_mts_idx (TS) | 0 | na | na | na | na | na |

Figure 1B:
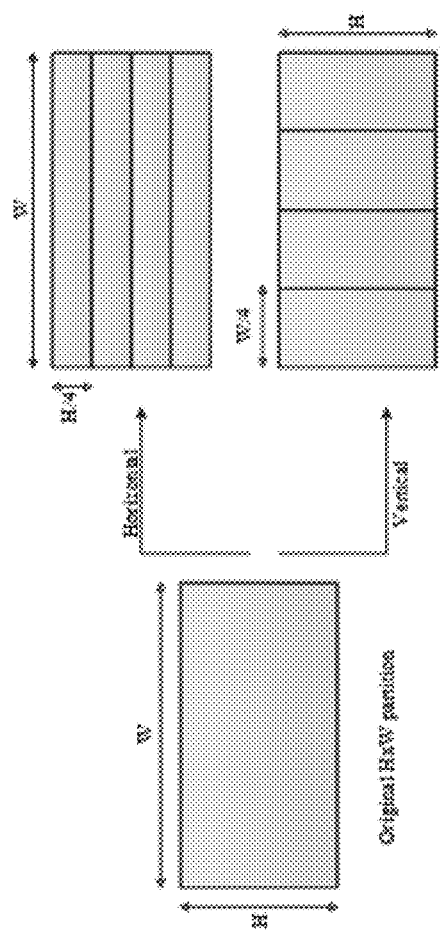
FIG. 1B is a diagram illustrating division of all blocks except 4×8, 8×4 and 4×4 blocks in the ISP coding mode of VVC.

The Intra Sub-Partitions (ISP) coding mode divides luma intra-predicted blocks vertically or horizontally into 2 or 4 sub-partitions depending on the block size dimensions, as shown in Table 3. FIGS. 1A and 1B show examples of the two possibilities. All sub-partitions fulfill the condition of having at least 16 samples. For chroma components, ISP is not applied.

TABLE 3

Number of sub-partitions depending on the block size

| Block Size | Number of Sub-Partitions |
|---|---|
| 4 × 4 | Not divided |
| 4 × 8 and 8 × 4 | 2 |
| All other cases | 4 |

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

The ISP algorithm will only be tested with intra modes that are part of the most probable mode (MPM) list. For this reason, if a block uses ISP, then the MPM flag will be inferred to be one. Besides, if ISP is used for a certain block, then the MPM list will be modified to exclude the DC mode and to prioritize horizontal intra modes for the ISP horizontal split and vertical intra modes for the vertical one.

In ISP, each sub-partition can be regarded as a sub-transform unit (TU), because the transform and reconstruction is performed individually for each sub-partition.

As described above, separate syntaxes and semantics are defined for TSM and MTS. However, these two tools are both related to transform selection, so the syntaxes and semantics can be harmonized.

In TSM, both horizontal and vertical transforms are skipped. However, it may be more flexible to have transform skipped for either horizontal or vertical, or both horizontal and vertical.

TSM is applied for blocks with area size smaller than or equal to 16, for 4×2 and 2×4 blocks, because the area size is not an even power of 2. To re-use the same quantization scheme, multiplication operations are needed in TSM, which are additional computation costs, in comparison to 4-point transform skip, which does not involve multiplications.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
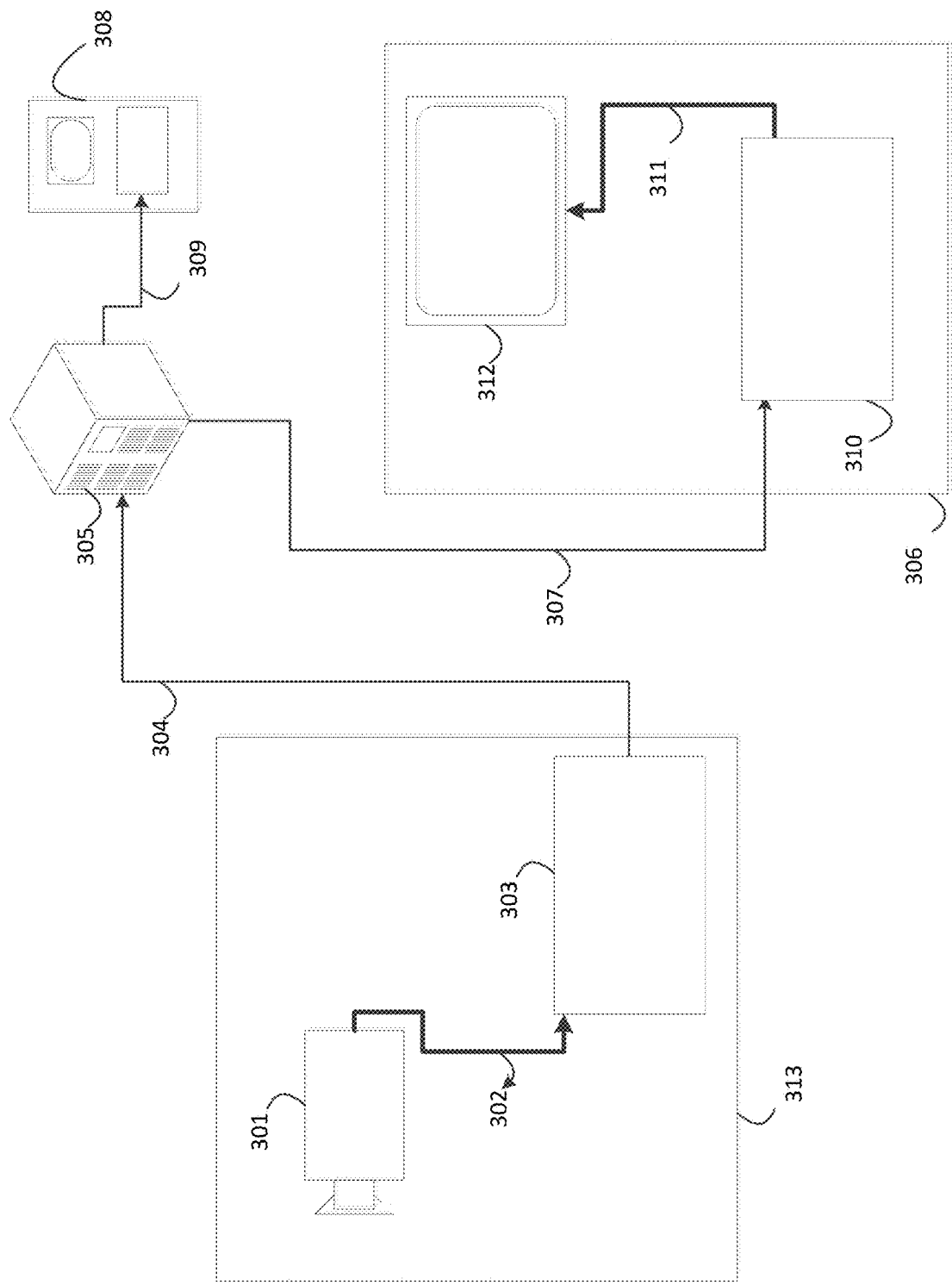
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) that decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
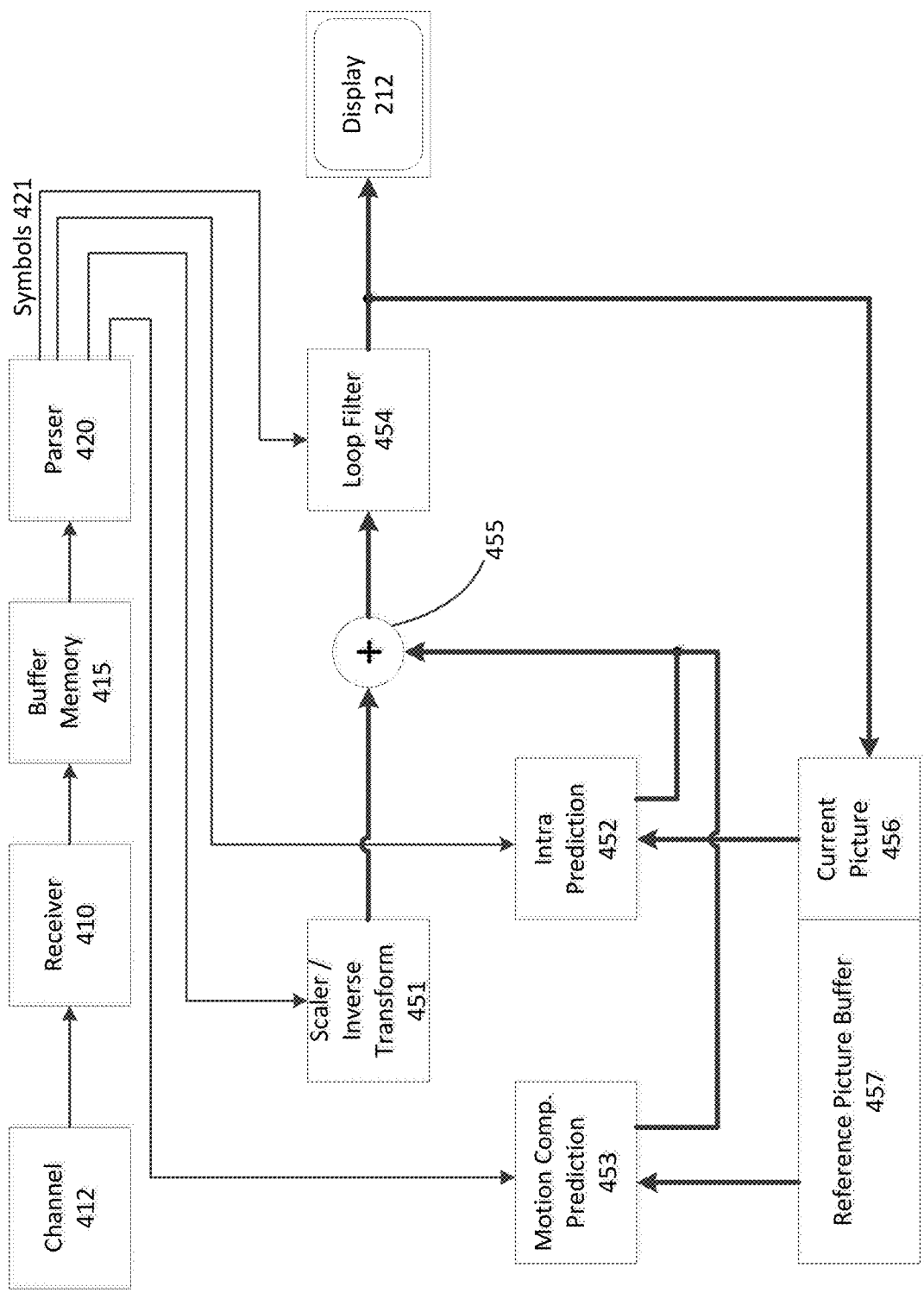
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); one coded video sequence at a time, in which the decoding of each coded video sequence is independent from other coded video sequences. The coded video sequence may be received from a channel (412), which may be a hardware/software link to a storage device that stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become a part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
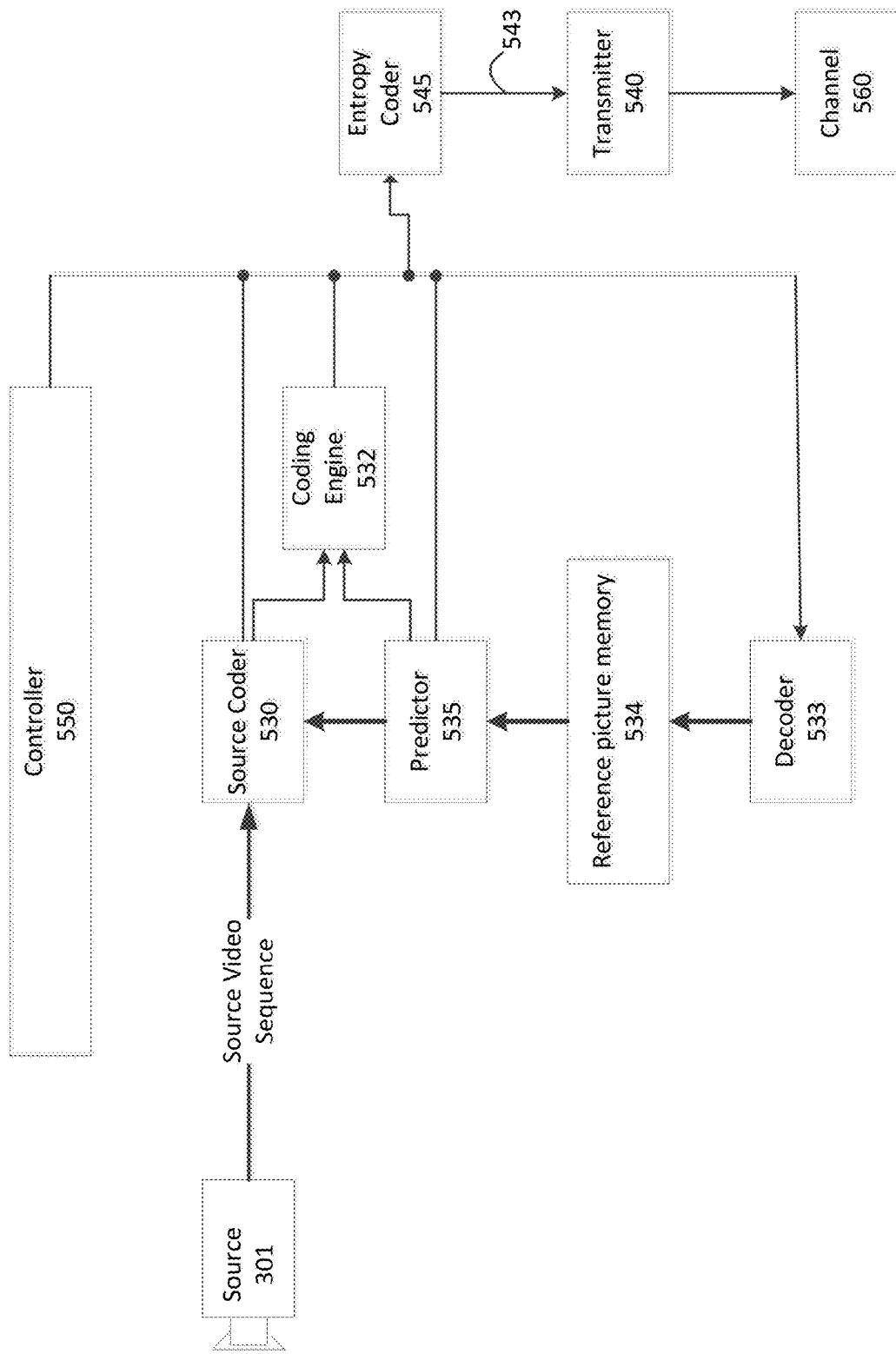
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Methods described below may be used separately or combined in any order. Further, each of the methods or embodiments, an encoder and a decoder may be implemented by processing circuitry, e.g., one or more processors or one or more integrated circuits. For example, the one or more processors execute a program that is stored in a non-transitory computer-readable medium. In the following description, the term "block" may be interpreted as a prediction block, a coding block, or a CU.

An N-point Identity transform (IDT) is defined as a linear transform process using an N×N transform core, which has only non-zero elements along diagonal positions. The diagonal positions refer to positions having equal horizontal and vertical coordinate values. In the following description related to binarization, another codeword that switches between '0' and '1' is also applicable. For example, when codeword '010' is described, another codeword '101' may also be used as an alternative.

In the following description, it may be assumed that a vertical prediction direction is using a prediction angle v, and a vertical-like intra prediction direction is defined as an intra prediction direction that is associated with a prediction angle that falls into a range of (v−thr, v+thr), where thr is a given threshold. It may be further assumed that a horizontal prediction direction is using a prediction angle h, and a vertical-like intra prediction direction is defined as an intra prediction direction that is associated with a prediction angle that falls into a range of (h−thr, h+thr), where thr is a given threshold.

In the following description, when describing DST-7 of an MTS candidate, it may also refer to DST-4. When describing DCT-8 of an MTS candidate, it may also refer to DCT-4.

According to embodiments, certain transform types of MTS are replaced by IDTs, and a TSM is replaced by using the IDT for both horizontal and vertical transforms.

In embodiments, the same syntax/semantics and binarization methods proposed in JVET-M0464 are kept.

In embodiments, the same syntax/semantics and binarization methods proposed in JVET-M0464 are kept, but a last MTS candidate, i.e., applying DCT-8 for both horizontal and vertical transforms, is removed.

In embodiments, binarization of MTS and TSM indices tu_mts_idx is modified as follows, where X can be either DCT-2 or DST-7 or the Hadamard transform or the Haar transform:

| | transform type | | binarization | | |
|---|---|---|---|---|---|
| | | | MTS & TS | | |
| tu_mts_idx | horizontal | vertical | enabled | MTS enabled | TS enabled |
| 0 | IDT | IDT | 0 | — | 0 |
| 1 | DCT-2 | DCT-2 | 10 | 0 | 1 |
| 2 | DST-7 | DST-7 | 110 | 10 | — |
| 3 | IDT | X | 1110 | 110 | — |
| 4 | X | IDT | 1111 | 111 | — |

In embodiments, binarization of MTS and TSM indices tu_mts_idx is modified as follows, where X can be either DCT-2 or DST-7 or the Hadamard transform or the Haar transform:

| | transform type | | binarization | | |
|---|---|---|---|---|---|
| | | | MTS & TS | | |
| tu_mts_idx | horizontal | vertical | enabled | MTS enabled | TS enabled |
| 0 | IDT | IDT | 0 | — | 0 |
| 1 | IDT | X | 10 | 00 | 100 |
| 2 | X | IDT | 110 | 01 | 101 |
| 3 | DCT-2 | DCT-2 | 1110 | 10 | 11 |
| 4 | DST-7 | DST-7 | 1111 | 11 | — |

In embodiments, binarization of MTS and TSM indices tu_mts_idx is modified as follows, where X can be either DCT-2 or DST-7 or the Hadamard transform or the Haar transform:

| | transform type | | binarization | | |
|---|---|---|---|---|---|
| | | | MTS & TS | | |
| tu_mts_idx | horizontal | vertical | enabled | MTS enabled | TS enabled |
| 0 | IDT | IDT | 0 | — | 0 |
| 1 | DCT-2 | DCT-2 | 100 | 00 | — |
| 2 | DST-7 | DST-7 | 101 | 01 | — |
| 3 | IDT | X | 110 | 10 | 10 |
| 4 | X | IDT | 111 | 11 | 11 |

In embodiments, a first flag is signaled to indicate whether an IDT is used as a horizontal transform, or a vertical transform or both the horizontal and vertical transforms. In an example, if the first flag indicates that the IDT is not used as either the horizontal transform or the vertical transform, then another flag is signaled to indicate whether DCT-2 or DST-7 may be applied as both horizontal and vertical transforms. In another example, if the first flag indicates that the IDT is applied as either one or both of the horizontal and vertical transforms, then a second flag may signaled to indicate whether the IDT is applied as both the horizontal and vertical transforms, and if the second flag indicates that the IDT is not used as either the horizontal or vertical transform, then a third flag is signaled to indicate whether the IDT is applied as the horizontal or vertical transform. In still another example, the first flag is entropy coded using a context, and the context is derived depending on whether neighboring blocks are coded using the IDT or not.

In embodiments, binarization of MTS and TSM indices tu_mts_idx is modified as follows, where X can be either DCT-2 or DST-7 or the Hadamard transform or the Haar transform:

| | transform type | | binarization | | |
|---|---|---|---|---|---|
| | | | MTS & TS | | |
| tu_mts_idx | horizontal | vertical | enabled | MTS enabled | TS enabled |
| 0 | DCT-2 | DCT-2 | 00 | 00 | 11 |
| 1 | DST-7 | DST-7 | 01 | 01 | — |
| 2 | IDT | X | 100 | 10 | 100 |
| 3 | X | IDT | 101 | 11 | 101 |
| 4 | IDT | IDT | 11 | — | 0 |

In embodiment, depending on certain conditions using coded information being met, an MTS candidate may be adaptively replaced by the IDT. The certain conditions using the coded information include, but are not limited to, whether neighboring blocks are coded by the IDT (or the TSM) or not, whether a current block is coded by a certain intra prediction mode or not, whether the current block is coded by Intra Block Copy (IBC) or not, whether a current component is luma or chroma, whether the current block is coded by a sub-block merge mode or not, and whether the current block is coded by an ISP mode. For example, when the current block is coded by intra prediction using a vertical-like or horizontal-like intra prediction mode, one of MTS candidates may be replaced by the IDT. In another example, when the current block is coded by intra prediction and is not applying fractional point interpolation, e.g., diagonal mode, horizontal mode, vertical mode, and intra prediction mode directions that are aligned with a diagonal direction of any available block shape (a wide angle intra prediction mode that does not need fractional point interpolation), one of MTS candidates may be replaced by the IDT.

In embodiments, if the TSM is to be replaced by the IDT used for both horizontal and vertical transforms, a first block size threshold is used to decide whether the IDT (used as both the horizontal and vertical transforms) replaces the TSM. If the IDT is replacing a certain MTS transform candidate, a second block size threshold is used to decide whether the IDT is replacing only one of the horizontal and vertical transforms. A block size of a current block may be any one or any combination of an area, a height and a width. The first block size threshold and second block size threshold can be different values. Each of the first block size threshold and the second block size threshold can be signaled in high-level syntax elements, such as a SPS, a Video Parameter Set (VPS), a Picture Parameter Set (PPS), a tile group header, a slice header, and a CTU header.

The TSM or IDT is not applied or signaled for certain coding modes, including a sub-block inter prediction mode, a bi-directional optical flow (BIO) mode, a sub-block transform (SBT), a multi-hypothesis intra-inter merge mode, a triangle partition mode, an ISP mode, and certain non-angular intra prediction modes (Planar and/or DC). Alternatively, when the TSM or IDT is applied, certain modes, such as the sub-block inter prediction mode, the BIO mode, the SBT, the multi-hypothesis intra-inter merge mode, the triangle partition mode, the ISP mode, and certain non-angular intra prediction mode (Planar and/or DC), are not applied or signaled.

In embodiments, for an encoder mode decision, instead of using only a Sum of Absolute Transform Difference (SATD) for measuring a cost of a candidate prediction mode, in which a transform is a linear transform such as the Hadamard transform, a Sum of Absolute Difference (SAD) is also applied in conjunction with the SATD. An output of a function of the SAD and the SATD is used as a final cost of the candidate prediction mode for the encoder mode decision. For example, the function may be min(SAD, SATD). In another example, the function may be a weighted sum of the SAD and the SATD. The final cost can be either used for an intra mode decision or an inter mode decision in which the SATD may be also used for motion estimation or candidate mode selection.

In detail, the above method may include applying the Hadamard transform on a residual block of a coded block, to generate a transform coefficient block, and determining a sum of absolute transform difference, based on the transform coefficient block. The method may further include determining a sum of absolute difference, based on the residual block, and determining a final cost of a candidate prediction mode for the coded block, based on the sum of absolute transform difference and the sum of absolute difference, i.e., a function of these two differences. The method may further include setting an MTS index to indicate that the TSM is enabled for the coded block, based on the final cost of the candidate prediction mode. In an example, final costs of three candidate prediction modes may be determined, and a candidate prediction mode having a least final cost among the determined final costs of the three candidate prediction modes may be selected to be used to predict whether the TSM is enabled for the coded block.

Figure 6:
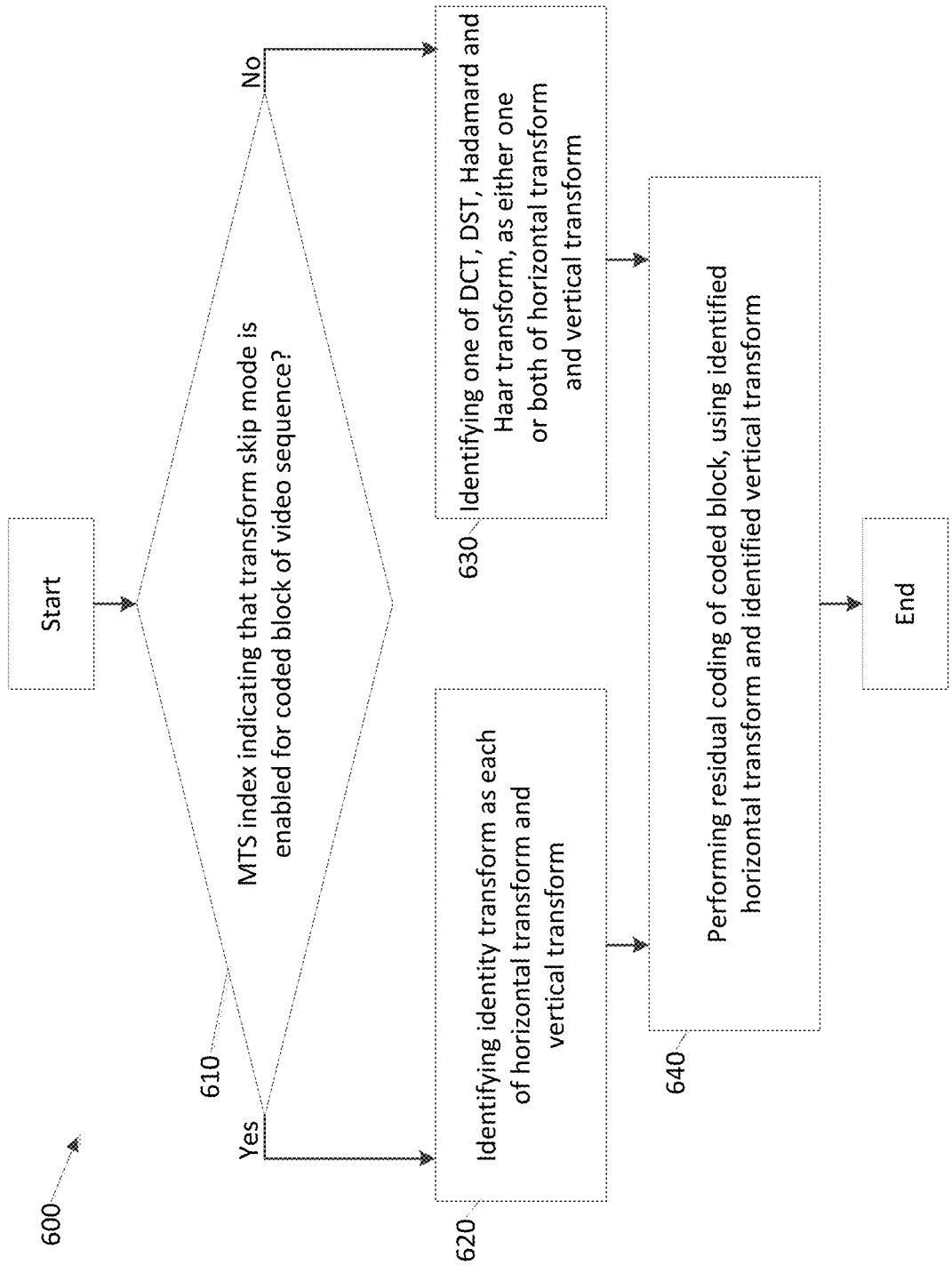
FIG. 6 is a flowchart illustrating a method of controlling residual coding for decoding or encoding of a video sequence, according to embodiments.

FIG. 6 is a flowchart illustrating a method (600) of controlling residual coding for decoding or encoding of a video sequence, according to embodiments. In some implementations, one or more process blocks of FIG. 6 may be performed by the decoder (310). In some implementations, one or more process blocks of FIG. 6 may be performed by another device or a group of devices separate from or including the decoder (310), such as the encoder (303).

Referring to FIG. 6, the method (600) includes, based on an MTS index indicating that a transform skip mode is enabled for a coded block of the video sequence (610—Yes), in a first block (620), identifying an identity transform as each of a horizontal transform and a vertical transform.

The method (600) further includes, based on the MTS index indicating that the transform skip mode is not enabled for the coded block (610—No), in a second block (630), identifying one of a discrete cosine transform (DCT), a discrete sine transform (DST), a Hadamard transform and a Haar transform, as either one or both of the horizontal transform and the vertical transform.

The method (600) further includes, in a third block (640), performing the residual coding of the coded block, using the identified horizontal transform and the identified vertical transform.

The identifying the one of the DCT, the DST, the Hadamard transform and the Haar transform, as either one or both of the horizontal transform and the vertical transform, may include, based on the MTS index indicating that the transform skip mode is not enabled for the coded block and indicating a first value, identifying the identity transform as the horizontal transform, and identifying one of a DCT-2, a DST-7, the Hadamard transform and the Haar transform, as the vertical transform.

The identifying the one of the DCT, the DST, the Hadamard transform and the Haar transform, as either one or both of the horizontal transform and the vertical transform, may include, based on the MTS index indicating that the transform skip mode is not enabled for the coded block and indicating a second value different than the first value, identifying one of the DCT-2, the DST-7, the Hadamard transform and the Haar transform, as the horizontal transform, and identifying the identity transform as the vertical transform.

The method (600) may further include determining whether any one or any combination of conditions is met, the conditions including whether neighboring blocks of the coded block are coded by the identity transform, whether the coded block is coded by an intra prediction mode, whether the coded block is coded by an intra block copy, whether a component of the coded block is luma or chroma, whether the coded block is coded by a sub-block merge mode, and whether the coded block is coded by an intra sub-partition mode. The method (600) may further include, based on the MTS index indicating that the transform skip mode is not enabled for the coded block and the any one or any combination of the conditions being determined to be met, identifying the identity transform as each of the horizontal transform and the vertical transform.

The method (600) may further include determining whether a size of the coded block is greater than a predetermined threshold, the size being one of an area, a height and a width. The method (600) may further include, based on the MTS index indicating that the transform skip mode is not enabled for the coded block, the any one or any combination of the conditions being determined to be met and the size of the coded block being determined to be greater than the predetermined threshold, identifying the identity transform as each of the horizontal transform and the vertical transform.

The method (600) may further include determining whether a size of the coded block is greater than a predetermined threshold, the size being one of an area, a height and a width. The identifying the identity transform as each of the horizontal transform and the vertical transform may include, based on the MTS index indicating that the transform skip mode is enabled for the coded block and the size of the coded block being determined to be greater than the predetermined threshold, identifying the identity transform as each of the horizontal transform and the vertical transform.

The method (600) may further include applying one of the DCT, the DST, and the Hadamard transform on a residual block of the coded block, to generate a transform coefficient block, determining a sum of absolute transform difference, based on the transform coefficient block, determining a sum of absolute difference, based on the residual block, determining a final cost of a candidate prediction mode for the coded block, based on the sum of absolute transform difference and the sum of absolute difference, and setting the MTS index to indicate that the transform skip mode is enabled, based on the final cost of the candidate prediction mode.

The final cost of the candidate prediction mode may be a minimum value among the sum of absolute transform difference and the sum of absolute difference.

The final cost of the candidate prediction mode may be a weighted sum of the sum of absolute transform difference and the sum of absolute difference.

Although FIG. 6 shows example blocks of the method (600), in some implementations, the method (600) may include additional blocks, fewer blocks, different blocks, or differently arranged blocks than those depicted in FIG. 6. Additionally, or alternatively, two or more of the blocks of the method (600) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 7:
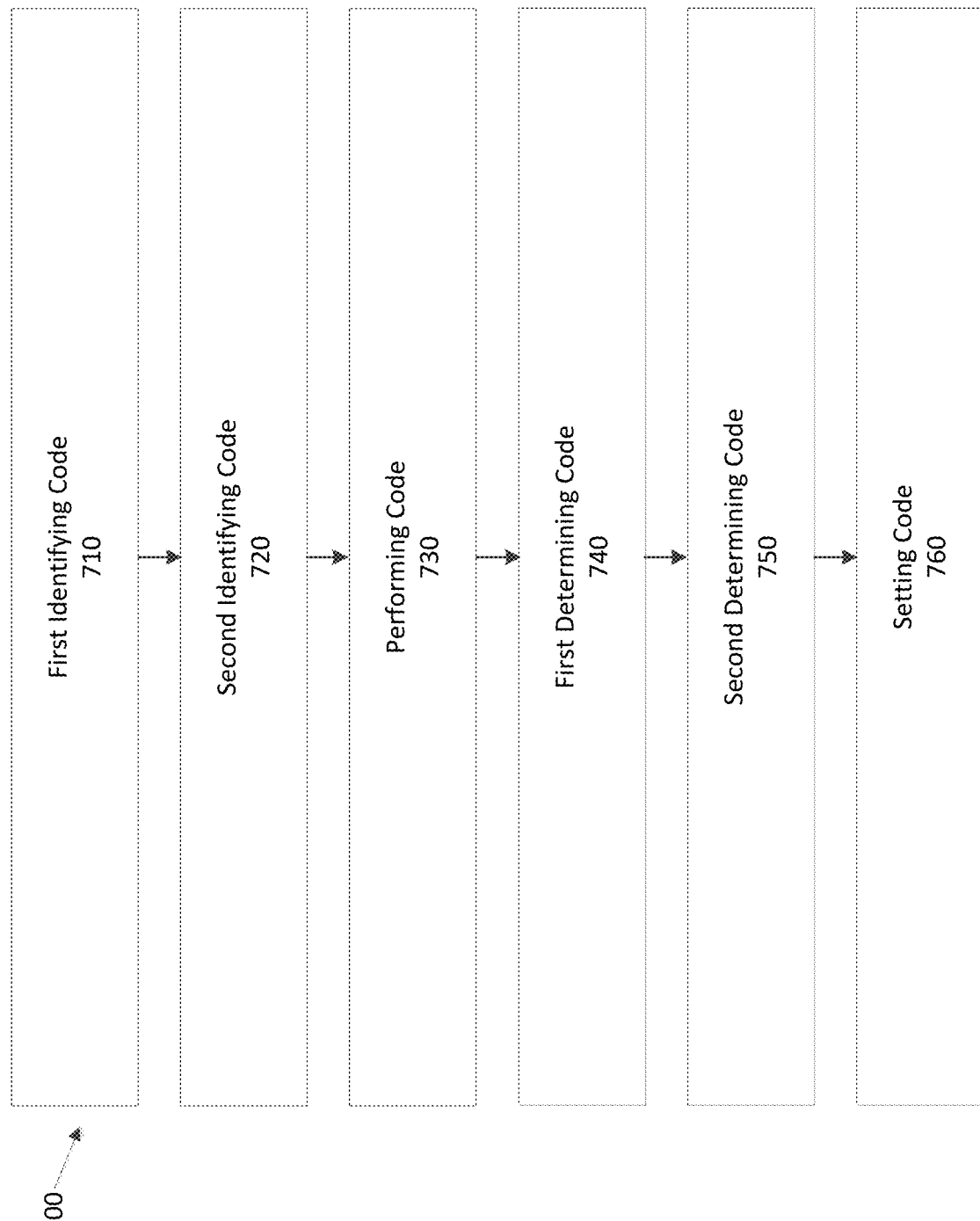
FIG. 7 is a simplified block diagram of an apparatus for controlling residual coding for decoding or encoding of a video sequence, according to embodiments.

FIG. 7 is a simplified block diagram of an apparatus (700) for controlling residual coding for decoding or encoding of a video sequence, according to embodiments.

Referring to FIG. 7, the apparatus (700) includes first identifying code (710), second identifying code (720), performing code (730), first determining code (740), second determining code (750) and setting code (760).

The first identifying code (710) is configured to cause the at least one processor to, based on an MTS index indicating that a transform skip mode is enabled for a coded block of the video sequence, identify an identity transform as each of a horizontal transform and a vertical transform.

The second identifying code (720) is configured to cause the at least one processor to, based on the MTS index indicating that the transform skip mode is not enabled for the coded block, identify one of a discrete cosine transform (DCT), a discrete sine transform (DST), a Hadamard transform and a Haar transform, as either one or both of the horizontal transform and the vertical transform.

The performing code (730) is configured to cause the at least one processor to perform the residual coding of the coded block, using the identified horizontal transform and the identified vertical transform.

The second identifying code (720) may be further configured to cause the at least one processor to, based on the MTS index indicating that the transform skip mode is not enabled for the coded block and indicating a first value, identify the identity transform as the horizontal transform, and identify one of a DCT-2, a DST-7, the Hadamard transform and the Haar transform.

The second identifying code (720) may be further configured to cause the at least one processor to, based on the MTS index indicating that the transform skip mode is not enabled for the coded block and indicating a second value different than the first value, identify one of the DCT-2, the DST-7, the Hadamard transform and the Haar transform, as the horizontal transform, and identify the identity transform as the vertical transform.

The first determining code (740) may be configured to cause the at least one processor to determine whether any one or any combination of conditions is met, the conditions including whether neighboring blocks of the coded block are coded by the identity transform, whether the coded block is coded by an intra prediction mode, whether the coded block is coded by an intra block copy, whether a component of the coded block is luma or chroma, whether the coded block is coded by a sub-block merge mode, and whether the coded block is coded by an intra sub-partition mode. The first identifying code (710) may be further configured to cause the at least one processor to, based on the MTS index indicating that the transform skip mode is not enabled for the coded block and the any one or any combination of the conditions being determined to be met, identify the identity transform as each of the horizontal transform and the vertical transform.

The second determining code (750) may be configured to cause the at least one processor to determine whether a size of the coded block is greater than a predetermined threshold, the size being one of an area, a height and a width. The first identifying code (710) may be further configured to cause the at least one processor to, based on the MTS index indicating that the transform skip mode is not enabled for the coded block, the any one or any combination of the conditions being determined to be met and the size of the coded block being determined to be greater than the predetermined threshold, identify the identity transform as each of the horizontal transform and the vertical transform.

The second determining code (750) may be configured to cause the at least one processor to determine whether a size of the coded block is greater than a predetermined threshold, the size being one of an area, a height and a width. The first identifying code (710) may be further configured to cause the at least one processor to, based on the MTS index indicating that the transform skip mode is enabled for the coded block and the size of the coded block being determined to be greater than the predetermined threshold, identify the identity transform as each of the horizontal transform and the vertical transform.

The setting code (760) may be configured to cause the at least one processor to apply one of the DCT, the DST, and the Hadamard transform on a residual block of the coded block, to generate a transform coefficient block, determine a sum of absolute transform difference, based on the transform coefficient block, determine a sum of absolute difference, based on the residual block, determine a final cost of a candidate prediction mode for the coded block, based on the sum of absolute transform difference and the sum of absolute difference, and set the MTS index to indicate that the transform skip mode is enabled, based on the final cost of the candidate prediction mode.

The final cost of the candidate prediction mode may be a minimum value among the sum of absolute transform difference and the sum of absolute difference.

The final cost of the candidate prediction mode may be a weighted sum of the sum of absolute transform difference and the sum of absolute difference.

The techniques described above, can be implemented as computer software using computer-readable instructions and physically stored in one or more computer-readable media.

FIG. 8 is a diagram of a computer system (800) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system (800) are examples in nature and are not intended to suggest any limitation as to the scope of use or functionality of the computer software implementing embodiments. Neither should the configuration of components be interpreted as having any dependency or requirement relating to any one or combination of components illustrated in the example embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (804), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (804), or joystick (805), but there can also be tactile feedback devices that do not serve as input devices), audio output devices (such as: speakers (809), headphones (not depicted)), visual output devices (such as screens (810) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art may also understand that term "computer readable media" as used in connection with the presently disclosed subject matter does not encompass transmission media, carrier waves, or other transitory signals.

Computer system (800) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((849)) (such as, for example universal serial bus (USB) ports of the computer system (800); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators (844) for certain tasks, and so forth. These devices, along with Read-only memory (ROM) (845), Random-access memory (RAM) (846), internal mass storage such as internal non-user accessible hard drives, solid-state drives (SSDs), and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). Architectures for a peripheral bus include peripheral component interconnect (PCI), USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several example embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of controlling residual coding for decoding or encoding of a video sequence, the method being performed by at least one processor, and the method comprising:
    based on a multiple transform selection (MTS) index indicating that a transform skip mode is enabled for a coded block of the video sequence, identifying an identity transform as each of a horizontal transform and a vertical transform, the identity transform being a linear transform process using an N×N transform core having only non-zero elements along diagonal positions;
    based on the MTS index indicating that the transform skip mode is not enabled for the coded block, identifying one of a discrete cosine transform (DCT), a discrete sine transform (DST), a Hadamard transform and a Haar transform, as either one or both of the horizontal transform and the vertical transform; and
    performing the residual coding of the coded block, using the identified horizontal transform and the identified vertical transform.

2. The method of claim 1, wherein the identifying the one of the DCT, the DST, the Hadamard transform and the Haar transform, as either one or both of the horizontal transform and the vertical transform, comprises, based on the MTS index indicating that the transform skip mode is not enabled for the coded block and indicating a first value:
    identifying the identity transform as the horizontal transform; and
    identifying one of a DCT-2, a DST-7, the Hadamard transform and the Haar transform, as the vertical transform.

3. The method of claim 2, wherein the identifying the one of the DCT, the DST, the Hadamard transform and the Haar transform, as either one or both of the horizontal transform and the vertical transform, comprises, based on the MTS index indicating that the transform skip mode is not enabled for the coded block and indicating a second value different than the first value:
    identifying one of the DCT-2, the DST-7, the Hadamard transform and the Haar transform, as the horizontal transform; and
    identifying the identity transform as the vertical transform.

4. The method of claim 1, further comprising:
    determining whether any one or any combination of conditions is met, the conditions comprising whether neighboring blocks of the coded block are coded by the identity transform, whether the coded block is coded by an intra prediction mode, whether the coded block is coded by an intra block copy, whether a component of the coded block is luma or chroma, whether the coded block is coded by a sub-block merge mode, and whether the coded block is coded by an intra sub-partition mode; and
    based on the MTS index indicating that the transform skip mode is not enabled for the coded block and the any one or any combination of the conditions being determined to be met, identifying the identity transform as each of the horizontal transform and the vertical transform.

5. The method of claim 4, further comprising:
    determining whether a size of the coded block is greater than a predetermined threshold, the size being one of an area, a height and a width; and
    based on the MTS index indicating that the transform skip mode is not enabled for the coded block, the any one or any combination of the conditions being determined to be met and the size of the coded block being determined to be greater than the predetermined threshold, identifying the identity transform as each of the horizontal transform and the vertical transform.

6. The method of claim 1, further comprising determining whether a size of the coded block is greater than a predetermined threshold, the size being one of an area, a height and a width, wherein the identifying the identity transform as each of the horizontal transform and the vertical transform comprises, based on the MTS index indicating that the transform skip mode is enabled for the coded block and the size of the coded block being determined to be greater than the predetermined threshold, identifying the identity transform as each of the horizontal transform and the vertical transform.

7. The method of claim 1, further comprising:

applying one of the DCT, the DST, and the Hadamard transform on a residual block of the coded block, to generate a transform coefficient block;

determining a sum of absolute transform difference, based on the transform coefficient block;

determining a sum of absolute difference, based on the residual block;

determining a final cost of a candidate prediction mode for the coded block, based on the sum of absolute transform difference and the sum of absolute difference; and setting the MTS index to indicate that the transform skip mode is enabled, based on the final cost of the candidate prediction mode.

8. The method of claim 7, wherein the final cost of the candidate prediction mode is a minimum value among the sum of absolute transform difference and the sum of absolute difference.

9. The method of claim 7, wherein the final cost of the candidate prediction mode is a weighted sum of the sum of absolute transform difference and the sum of absolute difference.

10. An apparatus for controlling residual coding for decoding or encoding of a video sequence, the apparatus comprising:

at least one memory configured to store computer program code; and at least one processor configured to access the at least one memory and operate according to the computer program code, the computer program code comprising:

first identifying code configured to cause the at least one processor to, based on a multiple transform selection (MTS) index indicating that a transform skip mode is enabled for a coded block of the video sequence, identify an identity transform as each of a horizontal transform and a vertical transform, the identity transform being a linear transform process using an N×N transform core having only non-zero elements along diagonal positions;

second identifying code configured to cause the at least one processor to, based on the MTS index indicating that the transform skip mode is not enabled for the coded block, identify one of a discrete cosine transform (DCT), a discrete sine transform (DST), a Hadamard transform and a Haar transform, as either one or both of the horizontal transform and the vertical transform; and performing code configured to cause the at least one processor to perform the residual coding of the coded block, using the identified horizontal transform and the identified vertical transform.

11. The apparatus of claim 10, wherein the second identifying code is further configured to cause the at least one processor to, based on the MTS index indicating that the transform skip mode is not enabled for the coded block and indicating a first value:

identify the identity transform as the horizontal transform; and identify one of a DCT-2, a DST-7, the Hadamard transform and the Haar transform, as the vertical transform.

12. The apparatus of claim 11, wherein the second identifying code is further configured to cause the at least one processor to, based on the MTS index indicating that the transform skip mode is not enabled for the coded block and indicating a second value different than the first value:

identify one of the DCT-2, the DST-7, the Hadamard transform and the Haar transform, as the horizontal transform; and identify the identity transform as the vertical transform.

13. The apparatus of claim 10, further comprising first determining code configured to cause the at least one processor to determine whether any one or any combination of conditions is met, the conditions comprising whether neighboring blocks of the coded block are coded by the identity transform, whether the coded block is coded by an intra prediction mode, whether the coded block is coded by an intra block copy, whether a component of the coded block is luma or chroma, whether the coded block is coded by a sub-block merge mode, and whether the coded block is coded by an intra sub-partition mode, wherein the first identifying code is further configured to cause the at least one processor to, based on the MTS index indicating that the transform skip mode is not enabled for the coded block and the any one or any combination of the conditions being determined to be met, identify the identity transform as each of the horizontal transform and the vertical transform.

14. The apparatus of claim 13, further comprising second determining code configured to cause the at least one processor to determine whether a size of the coded block is greater than a predetermined threshold, the size being one of an area, a height and a width, wherein the first identifying code is further configured to cause the at least one processor to, based on the MTS index indicating that the transform skip mode is not enabled for the coded block, the any one or any combination of the conditions being determined to be met and the size of the coded block being determined to be greater than the predetermined threshold, identify the identity transform as each of the horizontal transform and the vertical transform.

15. The apparatus of claim 10, further comprising second determining code configured to cause the at least one processor to determine whether a size of the coded block is greater than a predetermined threshold, the size being one of an area, a height and a width, wherein the first identifying code is further configured to cause the at least one processor to, based on the MTS index indicating that the transform skip mode is enabled for the coded block and the size of the coded block being determined to be greater than the predetermined threshold, identify the identity transform as each of the horizontal transform and the vertical transform.

16. The apparatus of claim 10, further comprising setting code configured to cause the at least one processor to:

apply one of the DCT, the DST, and the Hadamard transform on a residual block of the coded block, to generate a transform coefficient block;

determine a sum of absolute transform difference, based on the transform coefficient block;

determine a sum of absolute difference, based on the residual block;

determine a final cost of a candidate prediction mode for the coded block, based on the sum of absolute transform difference and the sum of absolute difference; and set the MTS index to indicate that the transform skip mode is enabled, based on the final cost of the candidate prediction mode.

17. The apparatus of claim 16, wherein the final cost of the candidate prediction mode is a minimum value among the sum of absolute transform difference and the sum of absolute difference.

18. The apparatus of claim 16, wherein the final cost of the candidate prediction mode is a weighted sum of the sum of absolute transform difference and the sum of absolute difference.

19. A non-transitory computer-readable storage medium storing instructions that cause at least one processor to:

based on a multiple transform selection (MTS) index indicating that a transform skip mode is enabled for a coded block of a video sequence, identify an identity transform as each of a horizontal transform and a vertical transform, the identity transform being a linear transform process using an N×N transform core having only non-zero elements along diagonal positions;

based on the MTS index indicating that the transform skip mode is not enabled for the coded block, identify one of a discrete cosine transform (DCT), a discrete sine transform (DST), a Hadamard transform and a Haar transform, as either one or both of the horizontal transform and the vertical transform; and perform residual coding of the coded block, using the identified horizontal transform and the identified vertical transform.

20. The non-transitory computer-readable storage medium of claim 19, wherein the instructions further cause the at least one processor to, based on the MTS index indicating that the transform skip mode is not enabled for the coded block and indicating a first value:

identify the identity transform as the horizontal transform; and identify one of a DCT-2, a DST-7, the Hadamard transform and the Haar transform, as the vertical transform.

* * * * *